US008979689B2

(12) United States Patent
Dierl

(10) Patent No.: US 8,979,689 B2
(45) Date of Patent: Mar. 17, 2015

(54) SYNCHRONOUS FLAT BELT DRIVE

(75) Inventor: Ludwig Dierl, Hennef (DE)

(73) Assignee: Ludwig Dierl, Hennef (DE)

( * ) Notice: Subject to any disclaimer, the term of this patent is extended or adjusted under 35 U.S.C. 154(b) by 438 days.

(21) Appl. No.: 12/735,604

(22) PCT Filed: Mar. 27, 2008

(86) PCT No.: PCT/DE2008/000510
§ 371 (c)(1),
(2), (4) Date: Aug. 5, 2010

(87) PCT Pub. No.: WO2009/103253
PCT Pub. Date: Aug. 27, 2009

(65) Prior Publication Data
US 2011/0009219 A1    Jan. 13, 2011

(30) Foreign Application Priority Data
Feb. 21, 2008   (DE) .......................... 10 2008 018 759

(51) Int. Cl.
*F16H 7/00*     (2006.01)
*F16H 7/02*     (2006.01)
*F16H 55/17*    (2006.01)

(52) U.S. Cl.
CPC .............. *F16H 7/023* (2013.01); *F16H 55/171* (2013.01)
USPC ....................................................... 474/153

(58) Field of Classification Search
CPC .................................. F16G 1/28; F16H 7/023
USPC .................................................. 474/151–153
See application file for complete search history.

(56) References Cited

U.S. PATENT DOCUMENTS

| | | | | |
|---|---|---|---|---|
| 239,114 A * | 3/1881 | Reese | ............................ | 474/153 |
| 251,377 A * | 12/1881 | Reese | ............................ | 474/153 |
| 358,258 A * | 2/1887 | Dodge | ............................ | 474/151 |
| 1,144,414 A * | 6/1915 | Holmes | ............................ | 226/87 |
| 1,181,175 A * | 5/1916 | Shapiro | ............................ | 474/151 |
| 1,375,046 A * | 4/1921 | Hardy | ............................ | 474/259 |
| 1,683,955 A * | 9/1928 | Carrey | ............................ | 474/117 |
| 1,970,763 A * | 8/1934 | Miller et al. | ............................ | 474/164 |
| 2,408,666 A * | 10/1946 | Mallard | ............................ | 74/414 |
| 2,724,974 A * | 11/1955 | Ayres | ............................ | 474/100 |
| 2,998,871 A * | 9/1961 | Horn | ............................ | 192/17 R |
| 3,120,409 A * | 2/1964 | Beall | ............................ | 305/179 |
| 3,151,495 A * | 10/1964 | Kurtz | ............................ | 74/413 |

(Continued)

FOREIGN PATENT DOCUMENTS

DE       9403404 U1    4/1994
DE      10052275 A1   10/2000

(Continued)

*Primary Examiner* — Henry Liu

(57) ABSTRACT

The invention relates to a synchronous flat belt drive, wherein at least one series arrangement of projections (210) has a purely rolling engagement with a series arrangement of apertures on a flat belt (100). The flat belt (100) supports on a pulley (300) only radially, and on a rotation member (200) only tangentially. The generatrix of the series arrangement of apertures is the rolling of a pulley working surface cylinder with projecting projections (210) of a rotation member (200) formed as a face gear. The flat belt (100) is formed of at least a single strip in a layer arrangement of at least one layer, wherein the ends of the individual strips are variously arranged in a layer. An individual strip forms also several layers and is also as an endless strip part of a layer arrangement.

2 Claims, 22 Drawing Sheets

(56) References Cited

U.S. PATENT DOCUMENTS

| | | | | |
|---|---|---|---|---|
| 3,156,126 | A | * | 11/1964 | Olsen .......................... 474/153 |
| 3,156,130 | A | * | 11/1964 | Gant ........................... 474/151 |
| 3,436,978 | A | * | 4/1969 | Rahmes ....................... 474/254 |
| 3,494,214 | A | * | 2/1970 | Egli ............................. 474/203 |
| 3,498,684 | A | * | 3/1970 | Hallaman .................... 305/170 |
| 3,577,794 | A | * | 5/1971 | Kerfoot, Jr. ................. 474/204 |
| 3,603,069 | A | * | 9/1971 | Greive ........................... 57/105 |
| 3,642,120 | A | * | 2/1972 | Duhan .......................... 198/834 |
| 3,772,930 | A | * | 11/1973 | Lamport et al. ............ 474/153 |
| 3,812,953 | A | * | 5/1974 | Maschke ................. 198/803.15 |
| 3,851,536 | A | * | 12/1974 | Zeldman ...................... 474/148 |
| 3,948,110 | A | * | 4/1976 | Lassanske .................... 305/178 |
| 4,150,581 | A | * | 4/1979 | Walters ........................ 474/254 |
| 4,194,445 | A | * | 3/1980 | Gemsjager ...................... 99/618 |
| 4,218,932 | A | * | 8/1980 | McComber .................. 474/161 |
| 4,240,303 | A | * | 12/1980 | Mosley ......................... 474/144 |
| 4,261,214 | A | * | 4/1981 | Watanabe et al. ........... 474/156 |
| 4,351,636 | A | * | 9/1982 | Hager ........................... 474/135 |
| 4,543,080 | A | * | 9/1985 | Tangorra ...................... 474/204 |
| 4,568,320 | A | * | 2/1986 | Tangorra ...................... 474/152 |
| 4,573,953 | A | * | 3/1986 | Tangorra ...................... 474/152 |
| 4,595,388 | A | * | 6/1986 | Tangorra ...................... 474/204 |
| 4,643,701 | A | * | 2/1987 | Meyer et al. ................. 474/153 |
| 4,993,996 | A | * | 2/1991 | Horny et al. ................. 474/155 |
| 5,025,916 | A | * | 6/1991 | Kaminski ................. 198/803.15 |
| 5,119,924 | A | * | 6/1992 | Kaminski ................. 198/803.15 |
| 5,129,865 | A | * | 7/1992 | Brock et al. ................. 474/152 |
| 5,342,250 | A | * | 8/1994 | Sanders ........................ 474/249 |
| 5,437,580 | A | * | 8/1995 | Doring ......................... 474/153 |
| 5,967,924 | A | * | 10/1999 | Kwon ........................... 474/161 |
| 5,980,408 | A | * | 11/1999 | Schulz ........................ 474/161 |
| 6,070,713 | A | * | 6/2000 | Eichmann ..................... 198/834 |
| 6,117,034 | A | * | 9/2000 | Vine ............................. 474/134 |
| 6,510,586 | B1 | * | 1/2003 | Ginzel ............................. 16/79 |
| 6,652,336 | B1 | * | 11/2003 | Chambers ....................... 440/75 |
| 7,364,522 | B2 | * | 4/2008 | Miyata et al. ................. 474/199 |
| 7,488,144 | B2 | * | 2/2009 | Boyl-Davis et al. .......... 408/1 R |
| 7,578,565 | B2 | * | 8/2009 | Hirose et al. ................. 305/165 |
| 7,883,437 | B2 | * | 2/2011 | Braedt ......................... 474/160 |
| 7,914,408 | B2 | * | 3/2011 | Young .......................... 474/152 |
| 8,083,624 | B2 | * | 12/2011 | Young .......................... 474/161 |
| 2002/0176722 | A1 | | 11/2002 | Iijima et al. |
| 2005/0096169 | A1 | * | 5/2005 | Reichard, II .................. 474/152 |
| 2006/0194524 | A1 | * | 8/2006 | Neff ............................... 451/59 |
| 2007/0105674 | A1 | * | 5/2007 | Hogn ........................... 474/152 |
| 2007/0111833 | A1 | * | 5/2007 | Young .......................... 474/152 |
| 2008/0011586 | A1 | * | 1/2008 | Kanaris ......................... 198/834 |
| 2008/0058135 | A1 | * | 3/2008 | Naude ............................. 474/8 |
| 2008/0132367 | A1 | * | 6/2008 | Braedt ......................... 474/161 |
| 2010/0143030 | A1 | * | 6/2010 | Tanaka ......................... 403/356 |
| 2010/0331128 | A1 | * | 12/2010 | Johnson ....................... 474/150 |

FOREIGN PATENT DOCUMENTS

| | | |
|---|---|---|
| DE | 19836897 C2 | 1/2001 |
| EP | 0403818 A2 | 12/1990 |
| GB | 843812 A | 10/1956 |
| GB | 2138534 A | 10/1984 |
| WO | 8601570 | 3/1986 |

* cited by examiner

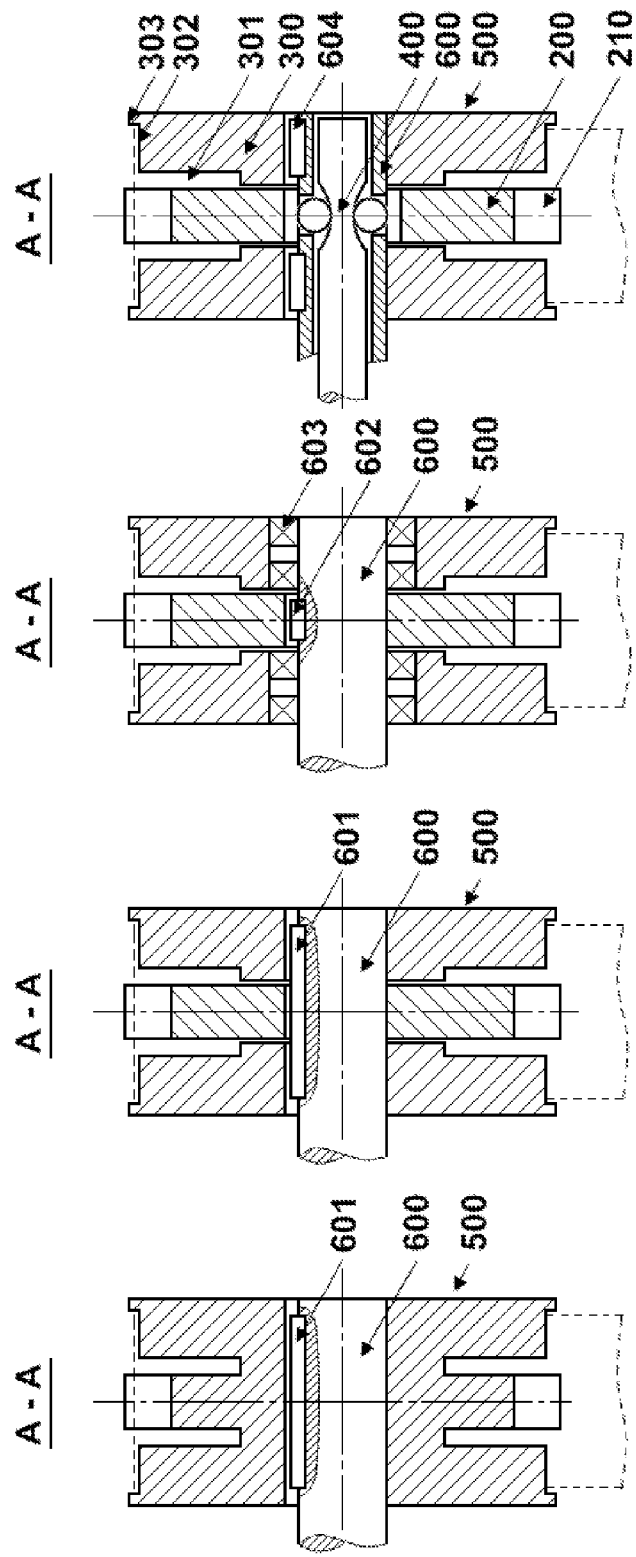

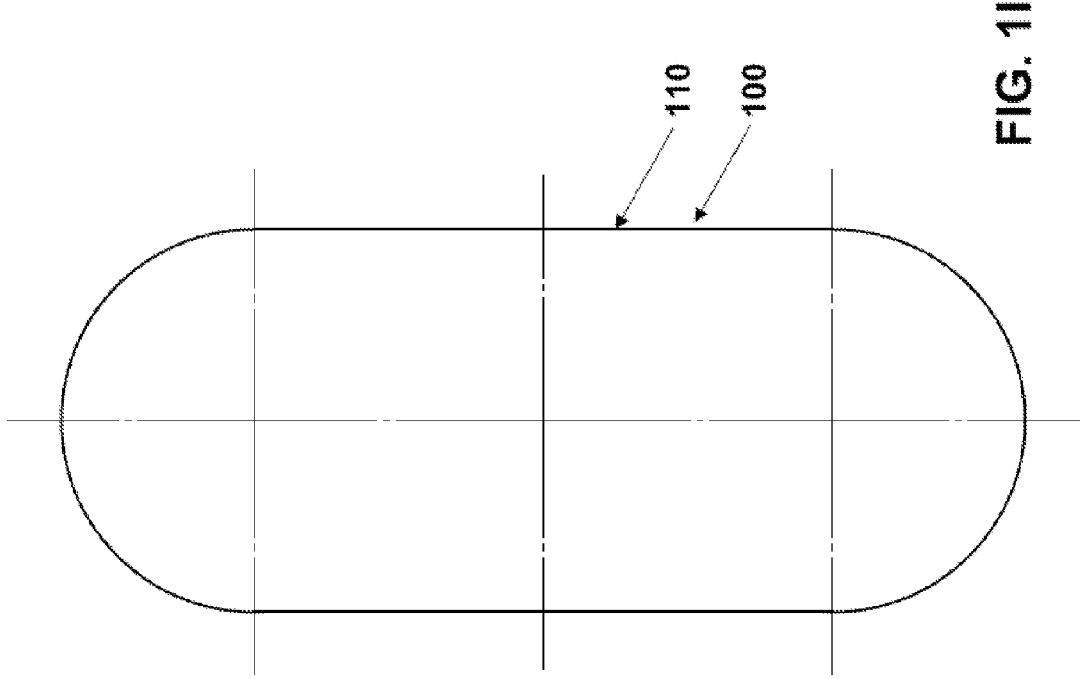

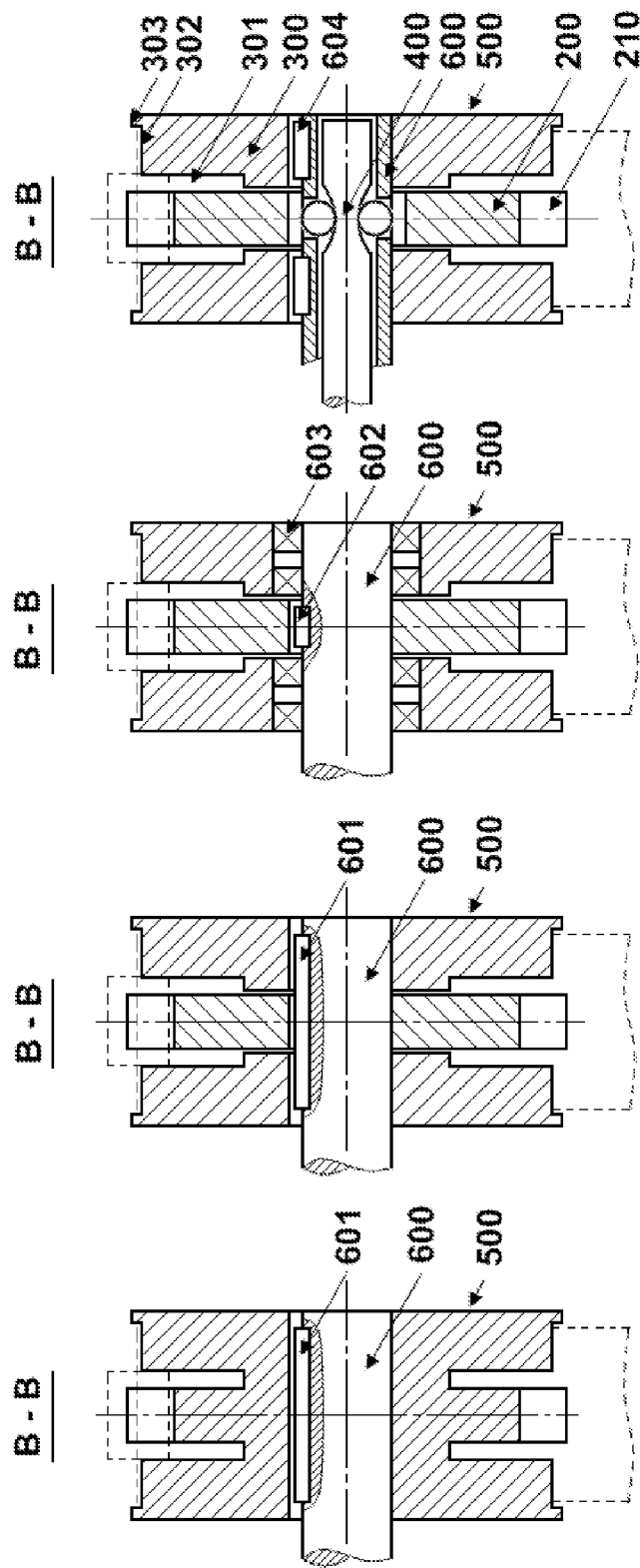

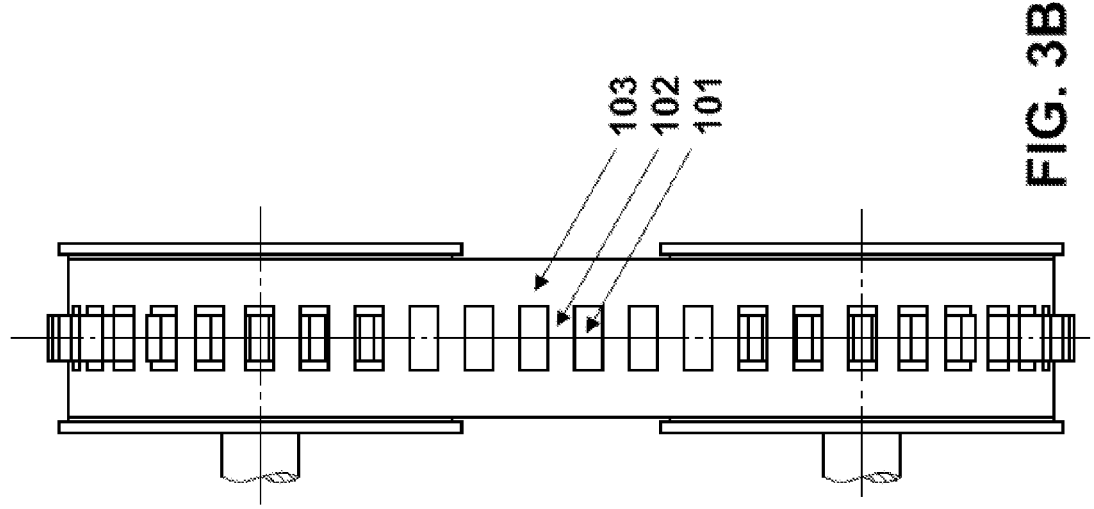
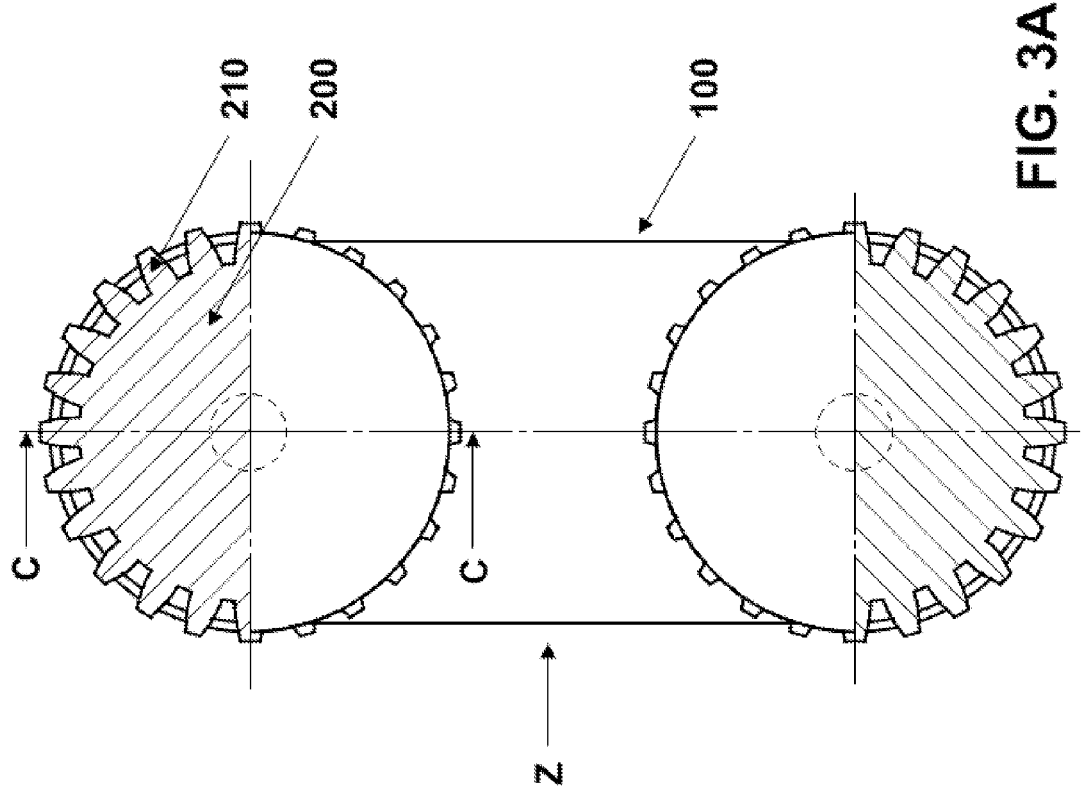

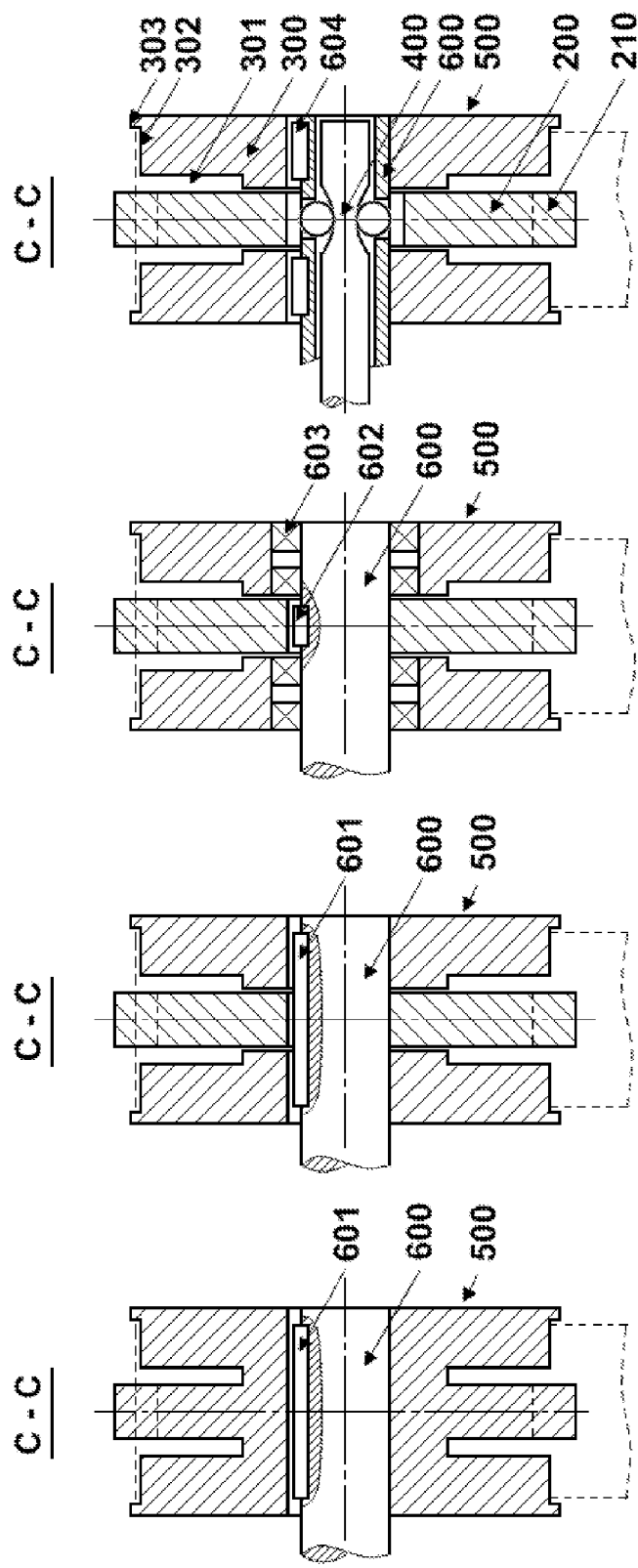

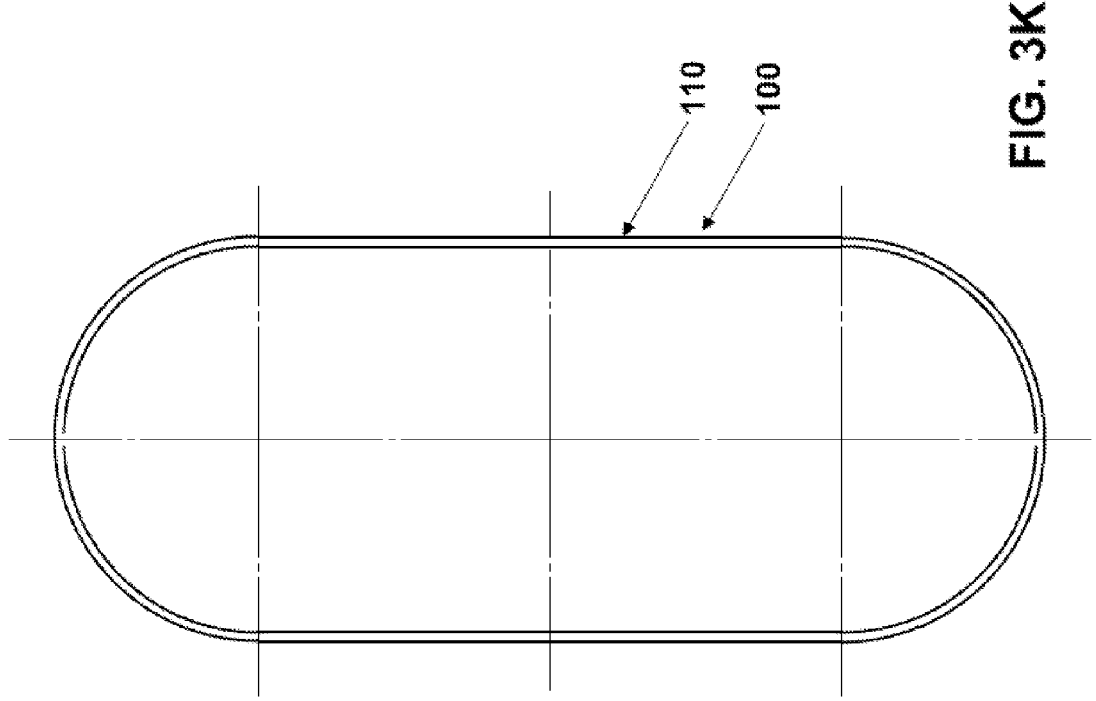

SYNCHRONOUS FLAT BELT DRIVE

BACKGROUND

1. Field of Invention

The invention concerns a synchronous flat belt drive according to the preamble of claim 1. It can be related to the IPC-classes F16H 7/02, F16H 55/30, and F16H 55/36.

2. Prior Art—The Story of the Invention

Since the mankind uses the technique for support of the daily life, it is confronted with friction. So, for example, more energy as fuel has to be supplied to an internal combustion engine, in order to obtain a predetermined performance, than is necessary according to the laws of thermodynamics. For, the movement of motor parts is inhibited by friction, and therefore a portion of the supplied fuel has to be spent for overcoming this friction, whereby heat is produced, which flows unused to the environment. Despite all inventions on the fields of electronics, of genetic engineering, or of nanotechnology we have obviously capitulated to the friction. Instead we try to reduce it, by providing, for example, as naturally almost like a law of nature our machines with lubricants. Thereby we have apparently lost sight of simple solutions of mechanics, although the man gladly uses them as the rocking horse at his first years of age, and as the rocking chair in the later years of age. It is the principle not to slide along on a surface, but instead to roll on a surface.

Here the invention starts. The objective is, rollingly transmitting a rotational movement at our machines.

Erroneously, often it is assumed, that a face gear, for example having an involute tooth system, as it is found in a large dissemination, for example, in the vehicle gearboxes, performs such a rolling movement. Unfortunately, this is not the case, for otherwise we could at least save the gearbox oil. With a slow motion simulation of the movement (see http://de.wikipedia.org/wiki/Bild:Involute_wheel.gif), which a tooth performs engaging in the opposing tooth system, one can easily recognise, that initially the tooth slides into along the opposing tooth, then rolls at the rolling circle, and afterwards again slides out along the opposing tooth. Thereby surface damages are produced on the teeth (Pitting). A rolling movement is only performed at the rolling circle. It is this circle, on which the tool rolled for forming the tooth system. Above and below the rolling circle there occurs a sliding with the generating of the energy consuming dynamic friction.

As a logical consequence, therefore it is proposed, letting a tooth engaging a tooth system of an opposing tooth, which only exists at the rolling circle. One can well imagine this at a gear rack, which is reduced to a thin layer around the rolling line. At the first glance, such a construction seems firstly not to be feasible, for an opposing tooth with such a small extension in tooth height direction would barely have the necessary strength (buckling), in order to withstand the force of the meshing tooth. Moreover, how the force in the gear rack or the gear should be transmitted. Here the next inventive step constitutes. The thin tooth system layer is not formed as compression receiving member, but as tension member. And, as is generally known, thin layers are able to transmit heavy tension loads. Nevertheless, here also occurs the problem of transmitting the force, which is applied by a meshing tooth to the opposing tooth system.

In a next inventive step, therefore the tension layer is flexibly formed, and is guided about a gear. However, such a guided tension layer would wedge in the tooth system by applying of tension force at its ends, whereby again friction would occur. This has to be prevented, namely, the flexible thin opposing tooth system layer has to be guided in a defined distance to the shaft of the gear. This defined distance is realized at a normal opposing gear by means of the bearing of this opposing gear. However, such a bearing is not possible for the thin flexible opposing tooth system layer. Here, the next inventive step constitutes. Namely, this support function is performed in a radial direction by means of cylindrical discs having a predetermined same diameter and a predetermined width, which are applied on both sides of the gear, directly adjacent to the gear, and coaxially to the shaft of the gear. Thereby the diameter is determined such, that it is greater than the foot circle diameter of the tooth system of the gear. So now, with applying of tension force at its ends, this thin flexible opposing tooth system layer can support in radial direction on the cylindrical peripheral surfaces on both sides adjacent to the gear, and performs at a circulation around the gear a purely rolling movement.

Now the problem of transmitting the force, which is applied from a meshing tooth to the opposing tooth system, can be solved. Namely, the thin opposing tooth system layer supports directly adjacent to the rolling cylinder, which is defined by the peripheral surfaces of the cylindrical discs to be adjacent to the gear, tangentially to this rolling cylinder on the tooth system of the gear. Namely, along the total winding circumference between the thin flexible opposing tooth system layer and the rolling cylinder, which is defined by the peripheral surfaces of the cylindrical discs. Unlike with the meshing of two gears the force is with the meshing of a gear together with a thin flexible opposing tooth system layer not pointwise transmitted between two teeth, but by means of a series of support lines, which the thin flexible opposing tooth system layer forms together with the tooth system of the gear along the winding circumference. Namely, each tooth of the gear pushes in movement direction of the gear along the winding circumference a tooth of the thin flexible opposing tooth system layer forward like a pulling horse its breast belt. A tooth of the gear newly coming in engagement contacts a tooth of the thin flexible opposing tooth system layer firstly, when with sidewise viewing of the gear a line, which is running from the centre of the gear through the symmetry axis of the newly in engagement coming tooth, is perpendicularly aligned to the thin incoming straightened flexible opposing tooth system layer. From here, the new tooth forms a support line, which is adjacent to the rolling cylinder and is aligned parallel to the axis of the rolling cylinder (with a spur gear tooth system). However, the tooth newly coming in engagement has to bear the load not alone, but shares the load together with the other pulling teeth along the winding circumference like the individual acting persons at a rope pulling.

By forming such pairings of gear and adjacent cylindrical discs on the one side and of a thin flexible opposing tooth system layer on the other side one can transmit rotation movements purely rolling.

Using such pairings for a purely rolling movement transmission, for example, for driving a camshaft by a crankshaft, both the cylindrical discs on both sides of a gear and the gear can be firmly connected to a shaft. For an application in a controlling gearbox, the cylindrical discs on both sides of a gear in a further inventive step, for example, can be firmly connected to a shaft, and the gear can be in a controllable form joint manner connected to a shaft. Thereby can the gears not yet being in the force flow with a shaft (controllable form joint connection not yet established) run on this shaft driven by the thin flexible opposing tooth system layer like in an idling, whereby a later coupling is simplified.

To be honest, the invention is not yet complete until hither. For, this thin flexible opposing tooth system layer has naturally to be bent at a circulation, and thereto deformation energy is necessary. Therefore, it would be all efforts made so far for avoiding the dynamic friction in vain, if now the saved fuel had to be applied as energy for deformation of the thin flexible opposing tooth system layer. Here, my experience with the construction of wings consisting of laminated layers of carbon fibre composite material could surprisingly provide further assistance. Namely, an initially limited damage, barely visible from outside, can evolve by an impact action on such a laminated layer to a catastrophic failure for the aircraft, by delaminating the layer configuration with the operating load starting from the initially limited damage position on a large area with the progressing time, and finally leading to a failure of the wing structure.

The reason for this one can understand with a small mathematical consideration. Namely, the geometrical moment of inertia of a homogeneous layer with a thickness $t_0$ and a width $b_0$ amounts $$I_0 = b_0 \cdot t_0^3 / 12;$$

on the other hand, the geometrical moment of inertia of a layer, which in turn consists of individual not to each other connected individual thin layers, each with a thickness $t = t_0/n$ ($n = 2, 3, 4, \ldots$) (with n thin individual layers) and a width $b_0$ for a single thin layer of the n layers, amounts $$I_n = b_0 \cdot (t_0/n)^3 / 12;$$

and further, the total geometrical moment of inertia of a layer of n individual thin layers amounts $$I = n \cdot I_n = n \cdot b_0 \cdot (t_0/n)^3 / 12 = I_0 / n^2;$$

that is, when a layer with identical total thickness $t_0$ is produced instead from a homogeneous layer from, for example, 10 individual thin not to each other connected layers (n=10), then this total layer surprisingly has a lower geometrical moment of inertia by the factor 100, which in turn results as product together with the modulus of elasticity E the bending stiffness. That is, a delaminated wing has only a small fraction of the original bending stiffness, and inevitably has to fail.

As catastrophic as this effect is with a wing, the more pleasant is this effect with a thin flexible opposing tooth system layer. For, since the magnitude of the deformation energy necessary to be applied at a circulation of a thin flexible opposing tooth system layer is proportional to the magnitude of the bending stiffness, by forming the thin flexible opposing tooth system layer from in turn n individual thin layers with identical total thickness the deformation energy necessary for a circulation can be reduced to a small fraction equal $1/n^2$ of the original value (n=1).

Moreover it is known, that thin layers, particularly metal layers, can be formed by cold rolling with a high tensile strength. That means, the thin flexible opposing tooth system layer of in turn n individual thin layers runs not only almost without the need of deformation energy, but also a thin flexible opposing tooth system layer of in turn n individual thin layers surprisingly has a higher tensile strength with identical total thickness of the thin flexible opposing tooth system layer than an embodiment having one layer. Thereby, either the total thickness of the thin flexible opposing tooth system layer of in turn n individual thin layers can be reduced compared to the calculated value for an embodiment having a single layer, or the safety factor for the tensile strength can be increased.

Now, by these elements of the invention, here described, gear boxes, primary drive systems, secondary drive systems, and couplings, et cetera, according to the invention can be modified.

Further, for a commercial world-wide use it is important, that the invention can be well integrated in the already existing cosmos of the machine elements. Therefore, it is advantageously, using as gears, which engage in the thin flexible opposing tooth system layer, already established standardised gears.

Therewith the story of the present invention is told. Still additional inventive elements are described in the following.

Discussion

Now, the discussion with the prior art takes place. Therefore, in the following the thin flexible opposing tooth system layer is referred to as flat belt having a series arrangement of apertures, and in the following the tooth system of the gear is referred to as series arrangement of projections, and the cylindrical discs, which are adjacent on both sides to a gear, are referred to as pulleys.

Synchronous flat belt drives are in the drive technology for the synchronous transmission of rotation movements widely spread. They substantially consist of at least one cylindrical drive pulley and at least one cylindrical driven pulley, one flat belt in an opened or closed construction and a tensioning device for the flat belt, whereby the flat belt forms together with the pulleys as a result of the static friction force, which acts along the winding circumference between the flat belt and the respective pulley, a friction force joint connection, and whereby the flat belt forms together with the pulleys as a result of the engaging of a series arrangement of apertures on the flat belt in a series arrangement of projections on the respective pulley along the winding circumference between the flat belt and the respective pulley additionally to the above mentioned friction force joint connection a form joint connection.

Synchronous flat belt drives have compared to other synchronous drives, such as a roller chain drive and a tooth belt drive, the following advantages: a low noise emission due to an aerodynamically smooth surface of the flat belt, low production costs due to a simple construction of the flat belt, and no polygon effect due to the support of the flat belt on a cylindrical pulley working surface.

Nevertheless, until today synchronous flat belt drives have found no large dissemination, since with the known synchronous flat belt drives the rolling pairing of a flat belt aperture and a pulley projection enables no purely rolling. Thereby, at an operation of the synchronous flat belt drive friction losses and an increased wear occur. Furthermore, the circulating flat belts are not formed of individual thin separated layers, whereby a high deformation energy has to be spent at a circulation.

Particularly, the synchronous flat belt drives apply according to the U.S. Pat. No. 1,683,955 (Sep. 11, 1928), U.S. Pat. No. 2,408,666 (Oct. 1, 1946), U.S. Pat. No. 3,642,120 (Feb. 15, 1972), U.S. Pat. No. 3,772,930 (Nov. 20, 1973), U.S. Pat. No. 4,568,320 (Feb. 4, 1986), WO 86/01570 (Mar. 13, 1986) and U.S. Pat. No. 5,129,865 (Jul. 14, 1992) projections having a circular cross section, whereby by means of these projections beside the synchronisation function also the function of the lateral guidance of the flat belt is assumed. Moreover, between the individual projections in circumference direction of the pulley the flat belt radially supports to a pulley axis on the respective pulley working surface. By both operations, particularly at the getting into of an aperture in a projection and at the getting off of an aperture from a projection, friction forces are generated. By these friction forces the efficiency factor of the flat belt is reduced, and a wear is caused both at the projections and at the apertures. Furthermore, the wear debris caused by the friction forces directly accumulates in the foot area of a projection on the pulley working surface.

This reduction of the effective height of a projection can lead together with a widening of the aperture by the wear to a non-engaging of an aperture in a projection, whereby the flat belt is further damaged, and it comes to a failure of the synchronisation.

Further, the flat belts with the known synchronous flat belt drives are not formed in a layer configuration of at least one strip having several layers, whereby a higher bending stiffness and a lower strength with identical total thickness of the flat belt are obtained. Thereby, a efficiency factor benefit is not realised, because at a circulation of a flat belt of a single layer a clearly higher deformation energy has to be spent than at a circulation of a flat belt of several layers with identical total thickness of the flat belt.

Further, the synchronisation with the known synchronous flat belt drives is not controllable. Thereby, it is not possible, in a run up phase or a run down phase, or during the operation of the synchronous flat belt drive to turn off or to turn on the synchronisation.

Further, the known synchronous flat belt drives are not standardised, and also can not be integrated in the standardisation system of the machine elements of the drive technology.

SUMMARY OF THE INVENTION

Objective and Achievement

The invention has the objective, to provide a synchronous flat belt drive, which without loss at the above mentioned advantages compared to the other synchronous drives, such as a roller chain drive and a tooth belt drive, shows none of the above mentioned disadvantages. This objective is achieved by a synchronous flat belt drive corresponding to the invention in accordance with the characteristics of the claims.

The Essential Core Elements of the Invention

For a better understanding in the following the essential core elements of the invention are described, without limiting the scope of the invention, which is defined by the appended claims and their legal equivalence.

The first core element of the invention comprises a frictionless force transmission occurring purely rolling between a flat belt of a layer construction and a cylindrical engaging body having rotation members, each of which comprises a series arrangement of projections, and having pulleys, whereby the rolling of the engaging body along the longitudinal axis of a flat belt, on a flat side of a planely arranged flat belt, is the generatrix of a series arrangement of apertures of the flat belt. Namely, with a circulating flat belt a series arrangement of apertures of a flat belt supports on a series arrangement of projections of an engaging body directly at the rolling cylinder in a direction substantially only tangentially to this rolling cylinder. Thereby, the flat belt supports in a direction radially to the engaging body axis substantially only on the pulleys of the engaging body.

The second core element of the invention comprises a frictionless getting into of the apertures in the projections and a frictionless getting off. This is realised by an axial guidance of the flat belt outside the engaging area, by having the apertures of a flat belt in axial direction of the engaging body a lateral clearance to the projections in the engaging area, and by guiding the longitudinal sides of the flat belt on both outer pulleys.

The third core element of the invention comprises the possibility of forming a flat belt having a high strength, which circulates due to its low bending stiffness almost without the applying of deformation energy. This is enabled, by forming the flat belt in an endless or opened construction in a layer configuration of individual endless or opened strips.

The fifth core element of the invention comprises the possibility, for example during a run up phase, of turning off the synchronisation of the rotational movement between the rotation members and the pulleys of an engaging body, and therewith also of several engaging bodies in the synchronous flat belt drive, and of turning on at a future date after a stabilisation of the rotational speed. This is realised, by enabling the rotation members to be connected to the pulleys of an engaging body in a controllable form joint manner, for example by a pulling wedge gear, or in a controllable friction force joint manner, for example by a friction coupling.

The sixth core element of the invention comprises for example the use of standardised gears as rotation members, whereby the existing standardisation system of the machine elements of the drive technology is extended by a series of standardised flat belts and a series of standardised pulleys of a synchronous flat belt drive.

Scopes

As future scopes of the present invention the precision mechanics, the automotive engineering, the ship technology, the aircraft engineering and the general mechanical engineering are possible. Thereby, the power to be transmitted ranges from few watts to several hundred kilowatts.

BRIEF DESCRIPTION OF THE DRAWINGS

In the appended drawings embodiments of the invention are exemplarily and in a non limiting manner illustrated and are described in the following.

There are shown in the FIG. 1a a partial sectional view of a first embodiment of the invention having two engaging bodies and a flat belt, whereby both engaging bodies each use a sprocket as a rotation member;

Figure 1B:
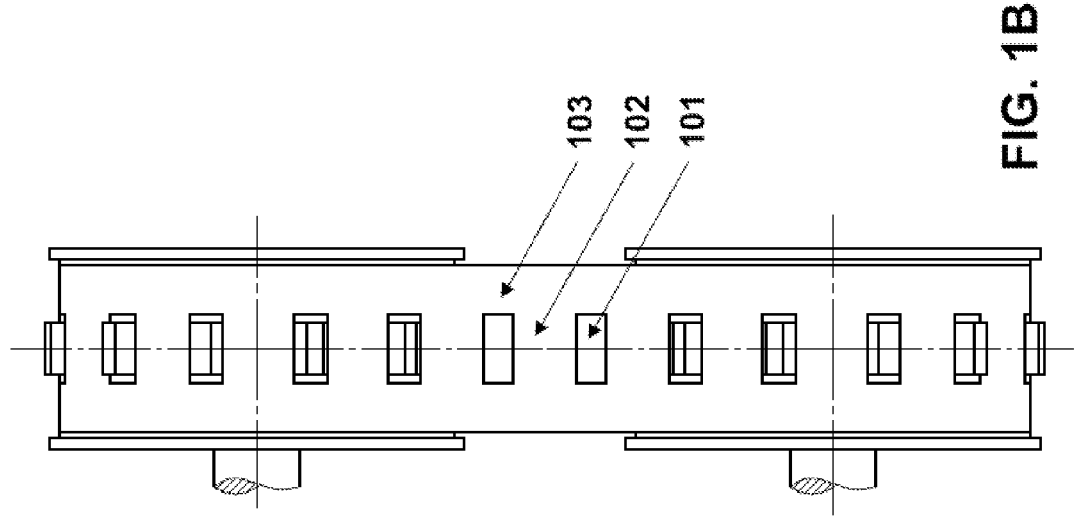
Figure 1A:
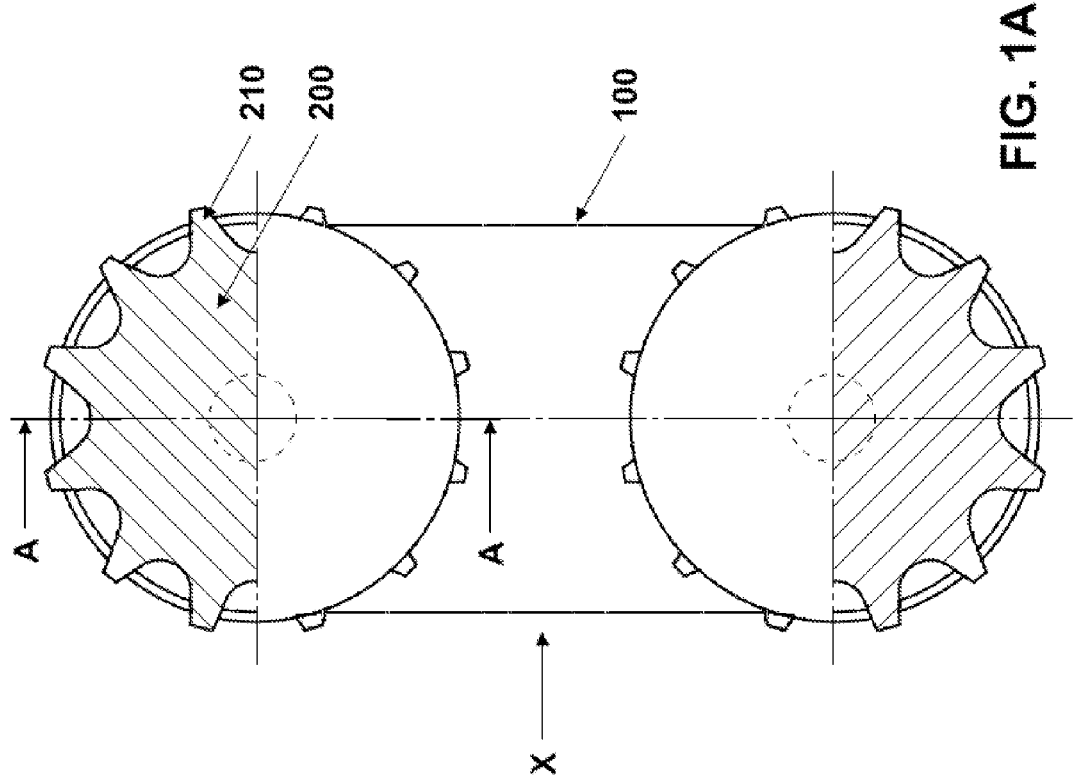
Figure 1H:
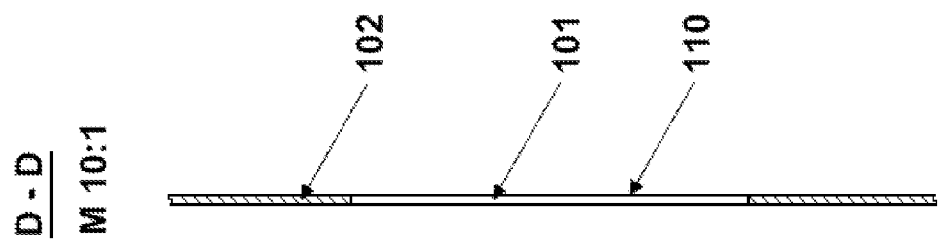
Figure 1G:
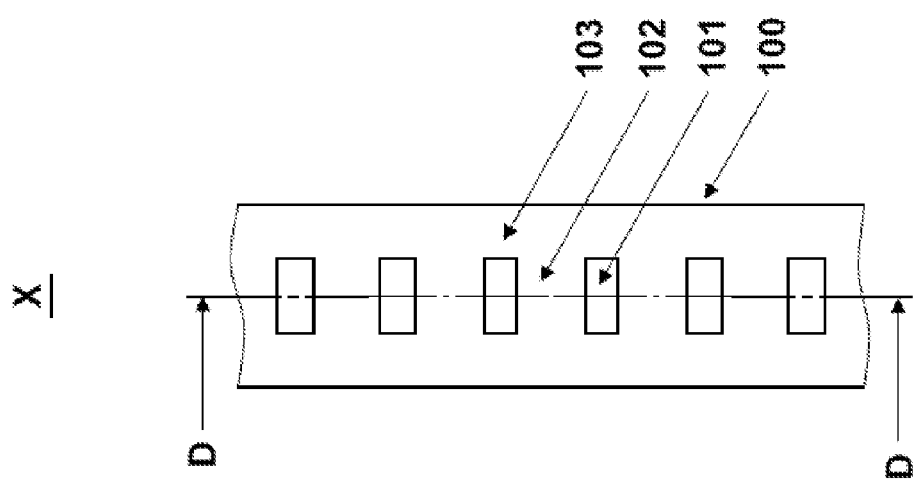
Figure 2B:
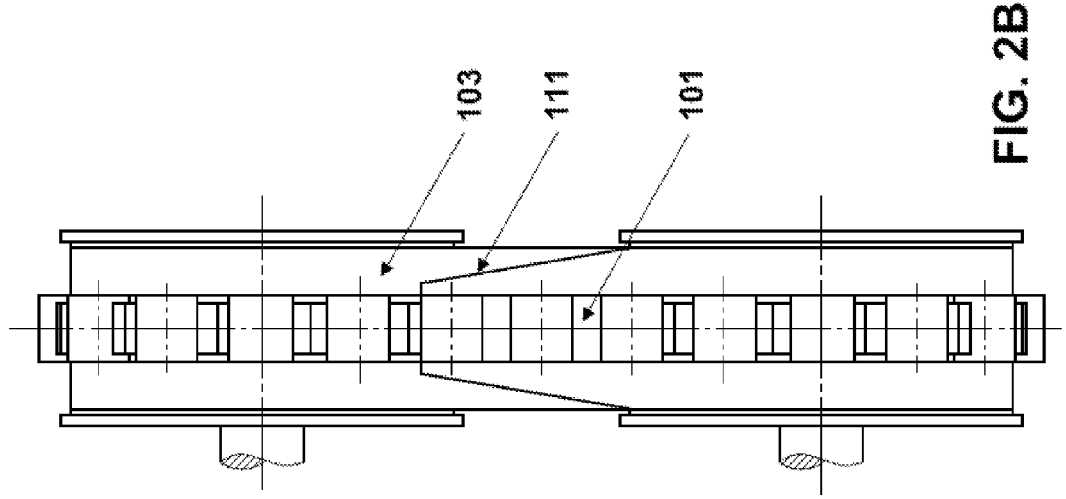
Figure 2A:
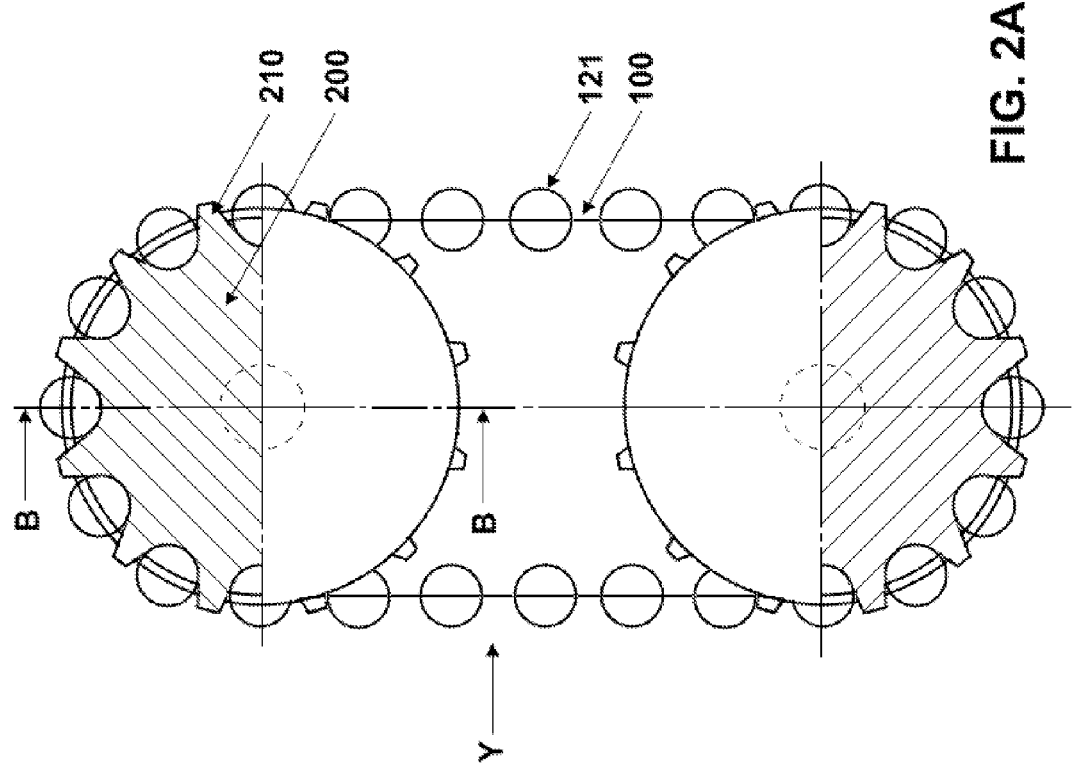
Figure 2H:
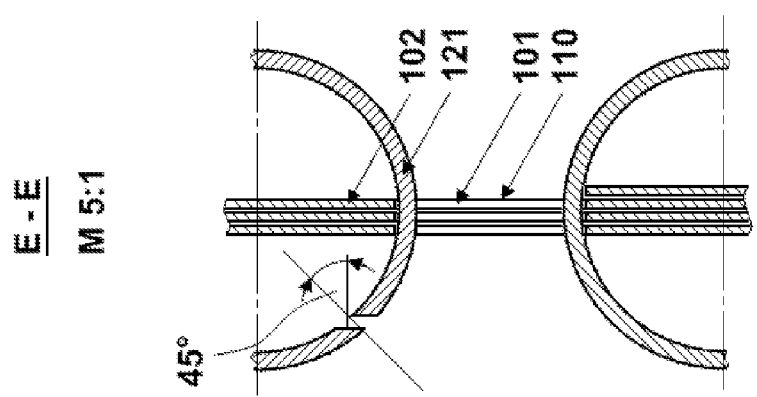
Figure 2G:
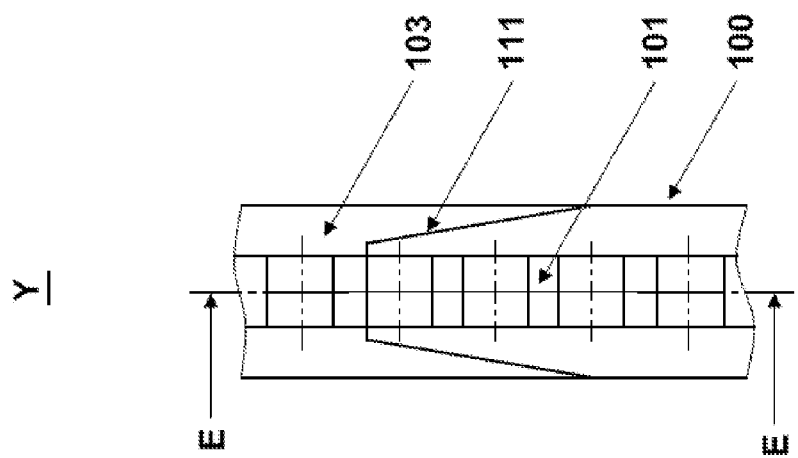
Figure 2I:
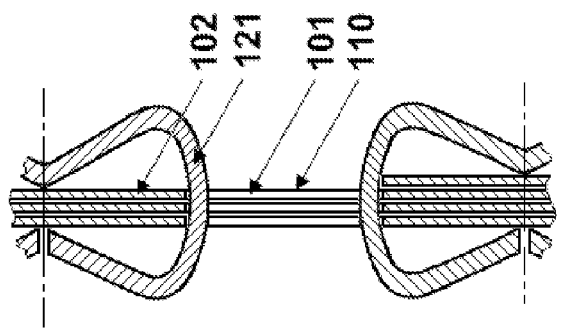
Figure 2J:
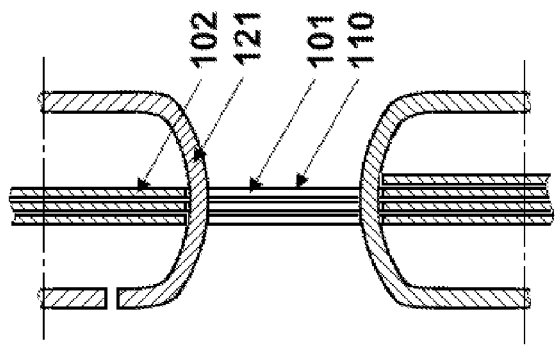
Figure 2K:
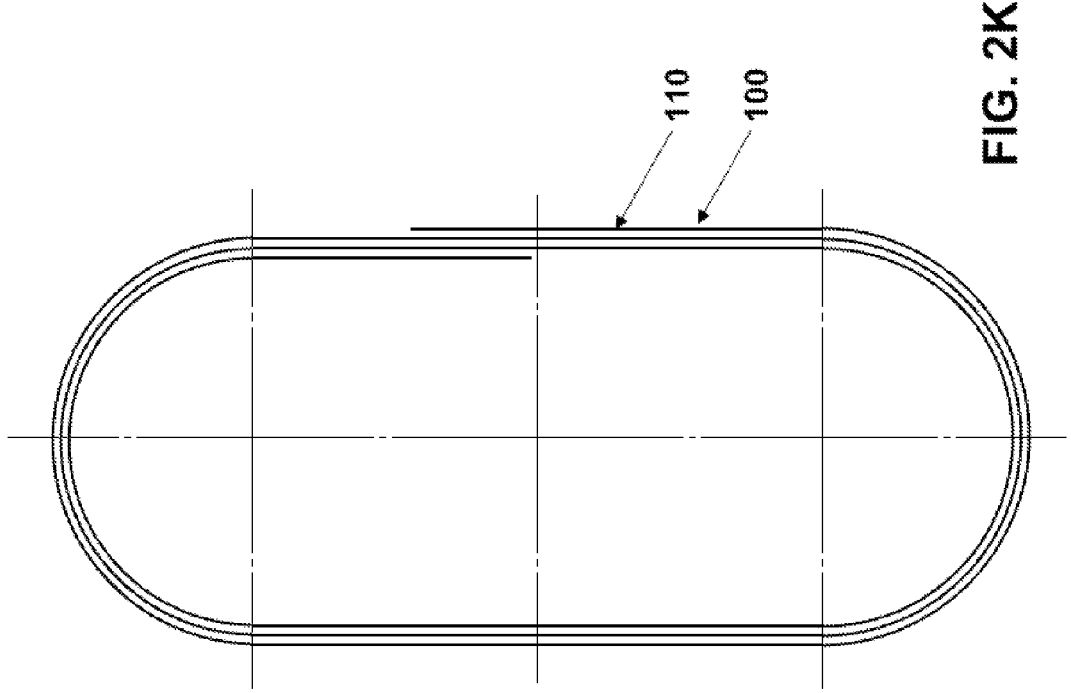
Figure 3H:
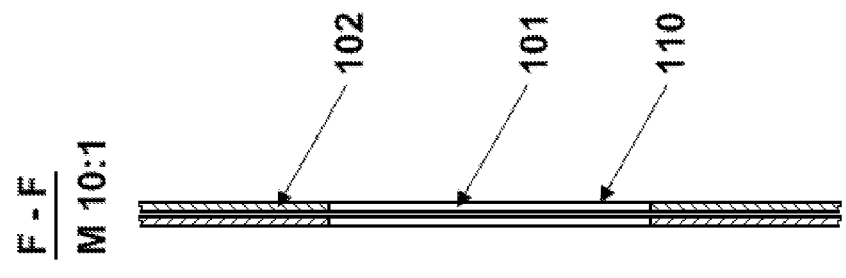
Figure 3G:
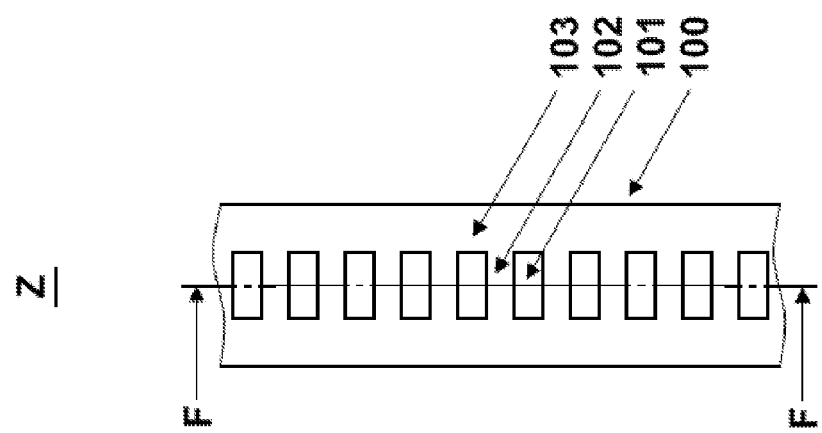
Figure 31:
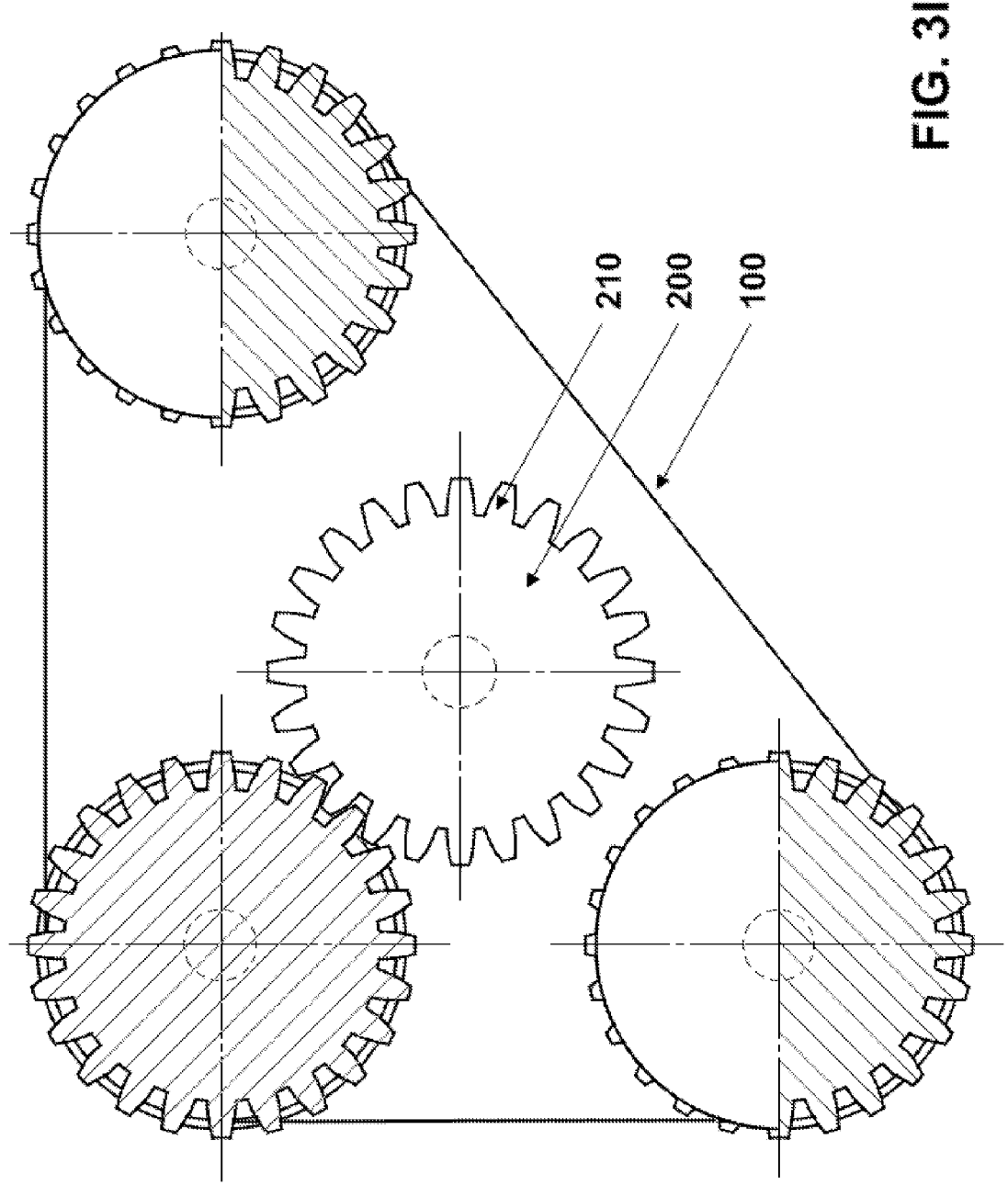
Figure 3J:
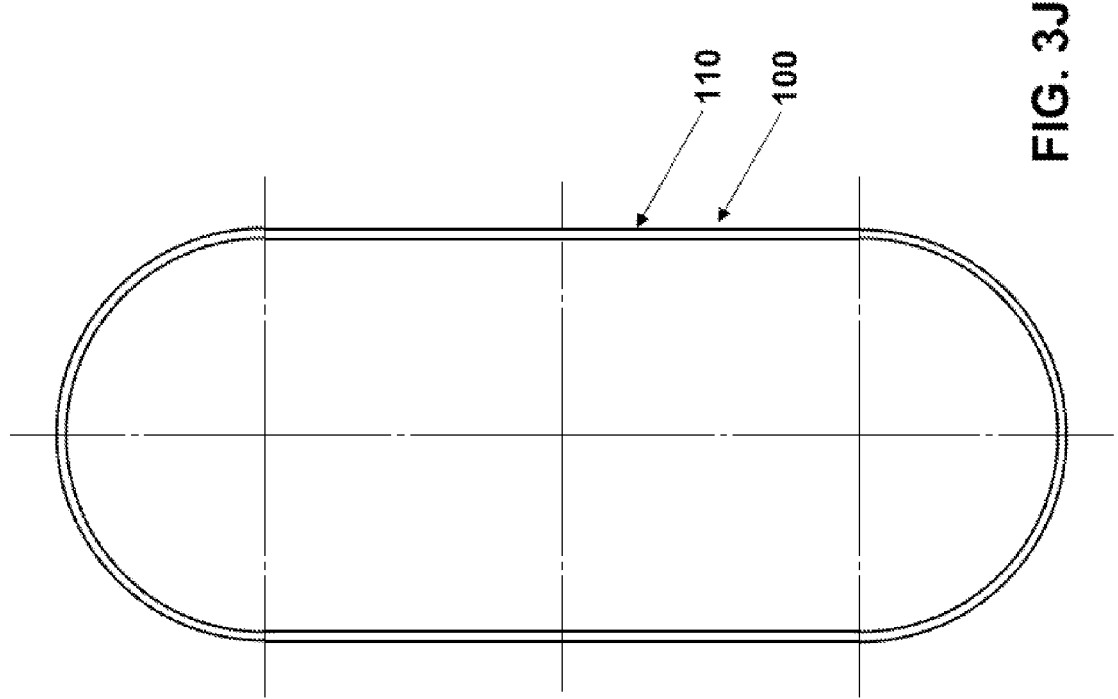
Figure 3M:
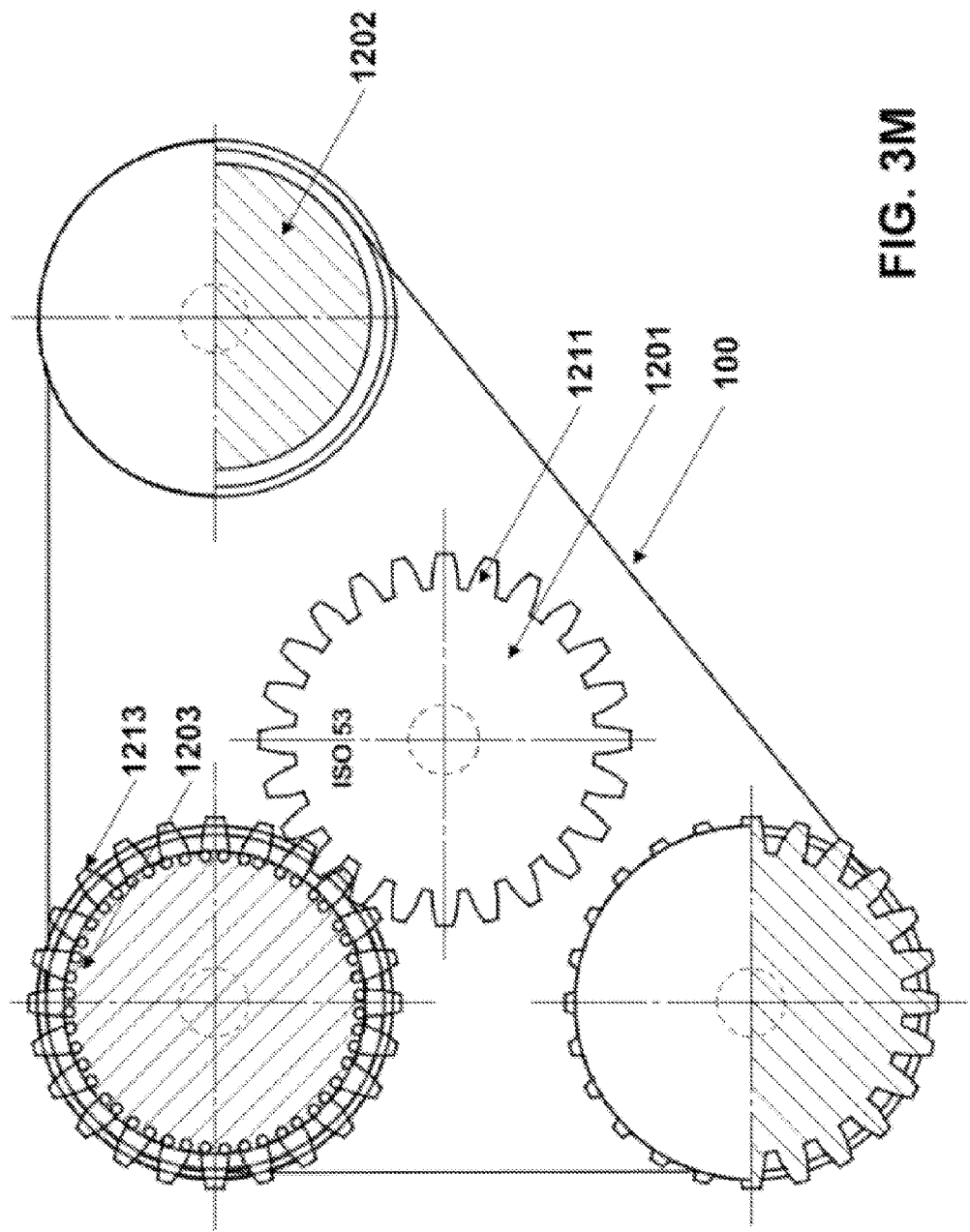
Figure 3P:
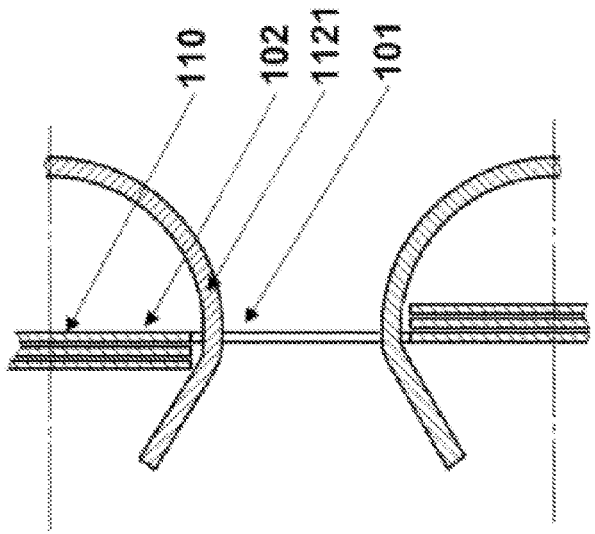
Figure 3N:
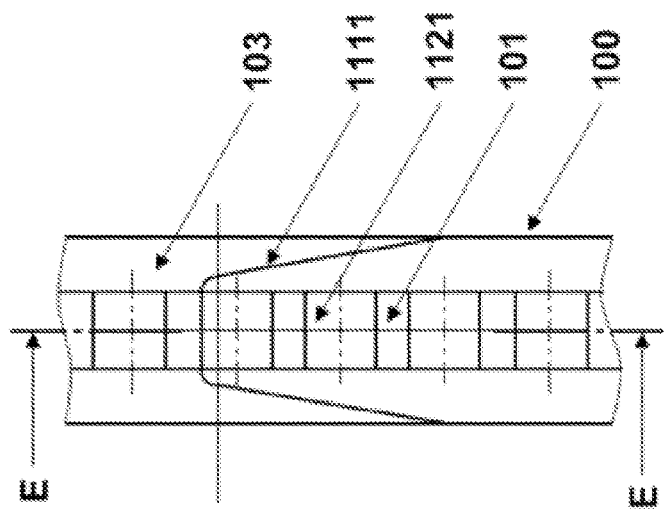
Figure 3Q:
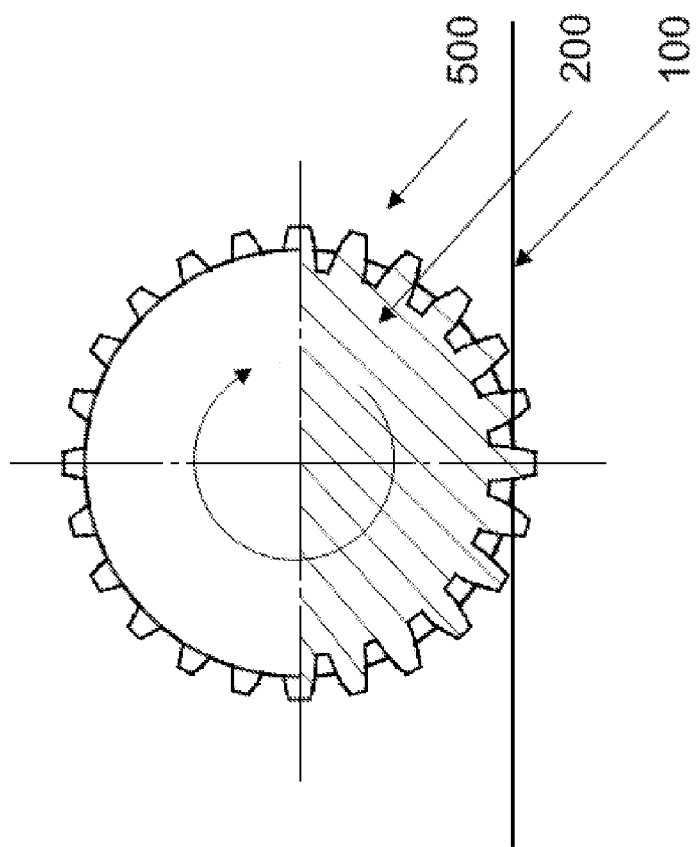
Figure 3R:
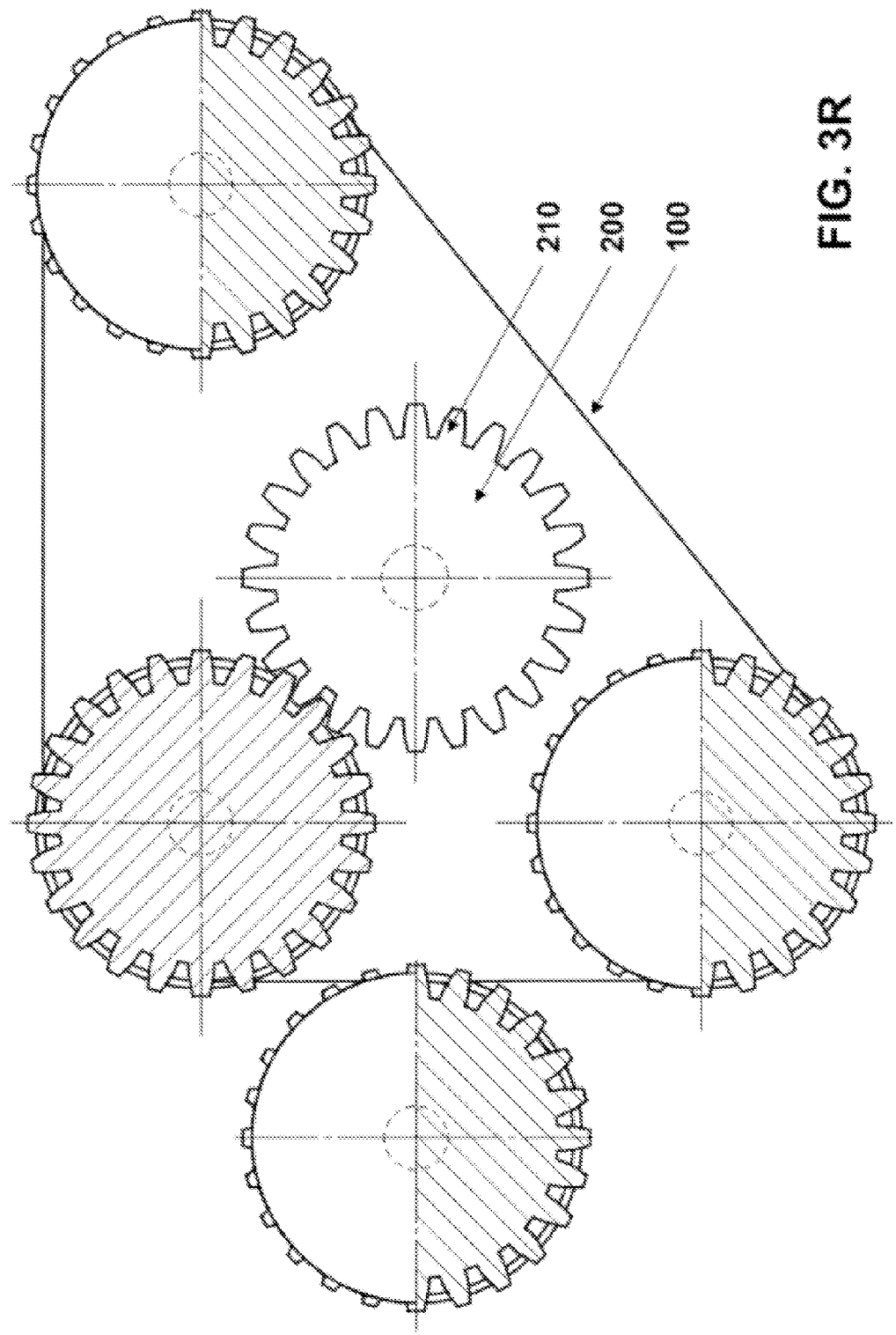
Figure 4:
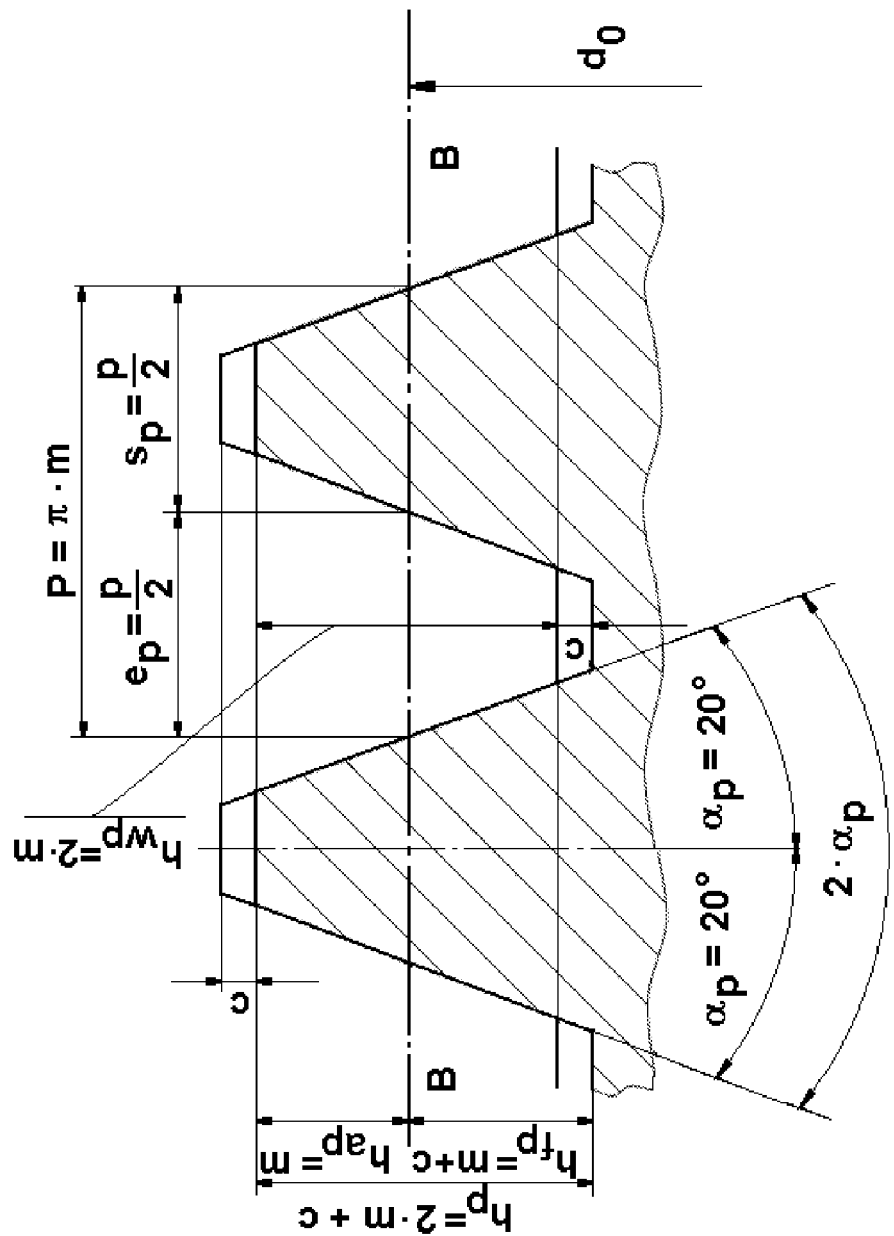
Figure 5:
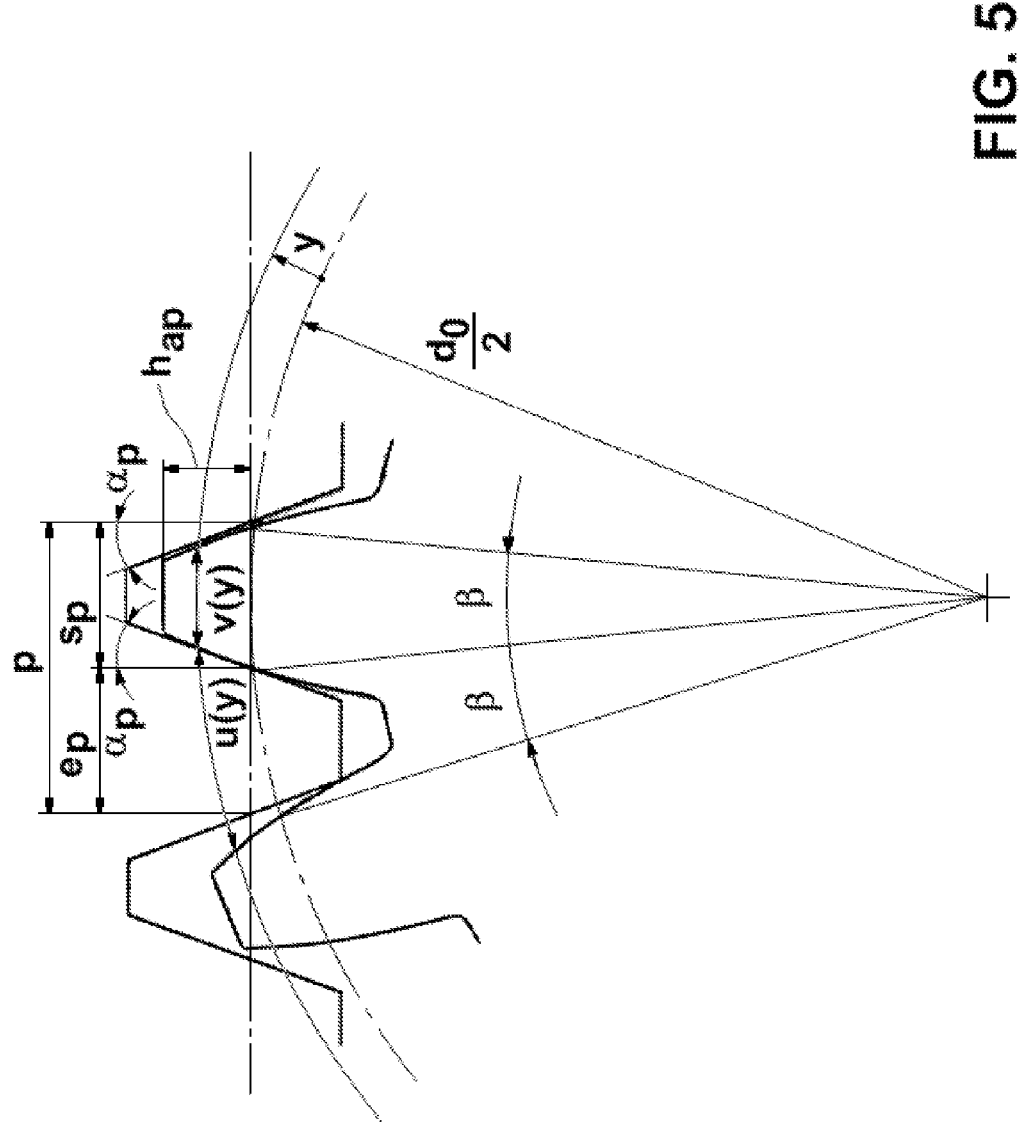
Figure 6:
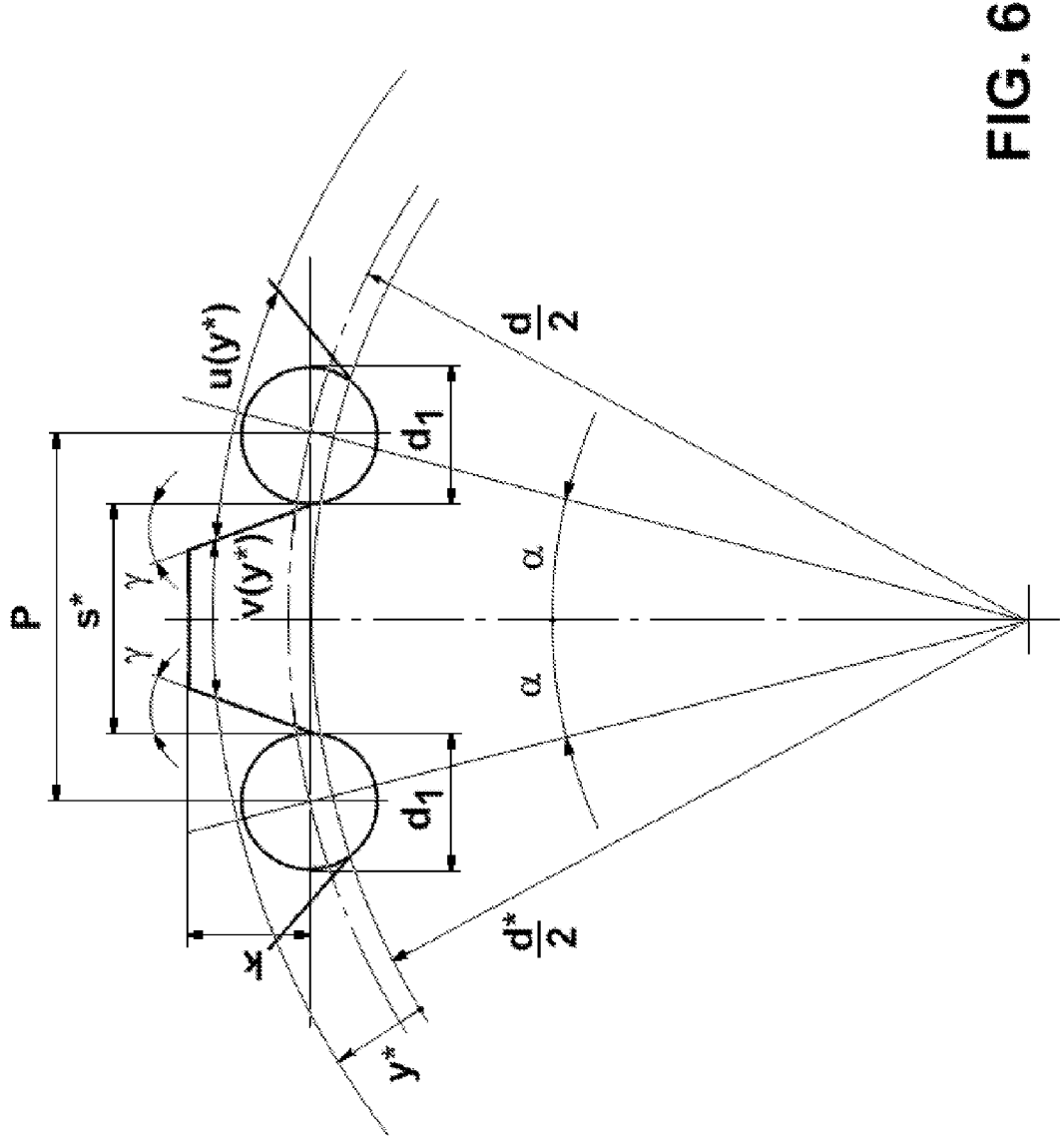

the FIG. 1b a lateral view of a partial sectional view of a first embodiment of the invention of FIG. 1a;

the FIG. 1c a sectional view of an engaging body of a first embodiment of the invention along the line A-A in FIG. 1a, whereby the rotation member is in a material joint manner connected to both adjacent pulleys;

the FIG. 1d a sectional view of an engaging body of a first embodiment of the invention along the line A-A in FIG. 1a, whereby the rotation member is in a form joint manner connected to both adjacent pulleys via a parallel key;

the FIG. 1e a sectional view of an engaging body of a first embodiment of the invention along the line A-A in FIG. 1a, whereby the rotation member is in a friction force joint manner connected to both adjacent pulleys via the flat belt, which is in engagement with the rotation member, by means of the static friction between the respective flat belt tension cord and the respective pulley working surface along the winding circumference between the respective flat belt tension cord and the respective pulley working surface;

the FIG. 1f a sectional view of an engaging body of a first embodiment of the invention along the Linie A-A in FIG. 1a, whereby the rotation member is in a controllable form joint manner connected to both adjacent pulleys via a pulling wedge gear and a pair of parallel keys of medium length;

the FIG. 1g a flat belt portion of a first embodiment of the invention from the viewing direction X in FIG. 1a;

the FIG. 1h a sectional view of a flat belt portion of a first embodiment of the invention along the line D-D in FIG. 1g;

the FIG. 1i schematically the path of a flat belt of a first embodiment of the invention in a closed construction, whereby the flat belt consists of a single endless strip;

the FIG. 2a a partial sectional view of a second embodiment of the invention having two engaging bodies and a flat belt, whereby both engaging bodies each use a sprocket as a rotation member;

the FIG. 2b a lateral view of a partial sectional view of a second embodiment of the invention of FIG. 2a;

the FIG. 2c a sectional view of an engaging body of a second embodiment of the invention along the line B-B in FIG. 2a, whereby the rotation member is in a material joint manner connected to both adjacent pulleys;

the FIG. 2d a sectional view of an engaging body of a second embodiment of the invention along the line B-B in FIG. 2a, whereby the rotation member is in a form joint manner connected to both adjacent pulleys via a parallel key;

the FIG. 2e a sectional view of an engaging body of a second embodiment of the invention along the line B-B in FIG. 2a, whereby the rotation member is in a friction force joint manner connected to both adjacent pulleys via the flat belt, which is in engagement with the rotation member, by means of the static friction between the respective flat belt tension cord and the respective pulley working surface along the winding circumference between the respective flat belt tension cord and the respective pulley working surface;

the FIG. 2f a sectional view of an engaging body of a second embodiment of the invention along the line B-B in FIG. 2a, whereby the rotation member is in a controllable form joint manner connected to both adjacent pulleys via a pulling wedge gear and a pair of parallel keys of medium length;

the FIG. 2g a flat belt portion of a second embodiment of the invention from the viewing direction Y in FIG. 2a;

the FIG. 2h a sectional view of a flat belt portion of a second embodiment of the invention along the line E-E in FIG. 2g, whereby the connecting members are enclosed by bushing shaped additional form members having the cross section shape of a circle;

the FIG. 2i a sectional view of a flat belt portion of a second embodiment of the invention along the line E-E in FIG. 2g, whereby the connecting members are enclosed by bushing shaped additional form members having the cross section shape of a "0";

the FIG. 2j a sectional view of a flat belt portion of a second embodiment of the invention along the line E-E in FIG. 2g, whereby the connecting members are enclosed by bushing shaped additional form members having the cross section shape of a "8";

the FIG. 2k schematically the path of a flat belt of a second embodiment of the invention in a closed construction, whereby the flat belt consists of a single opened wound up strip, which forms several layers;

the FIG. 3a a partial sectional view of a third embodiment of the invention having two engaging bodies and a flat belt, whereby both engaging bodies each use a face gear as rotation member;

the FIG. 3b a lateral view of a partial sectional view of a third embodiment of the invention of FIG. 3a;

the FIG. 3c a sectional view of an engaging body of a third embodiment of the invention along the line C-C in FIG. 3a, whereby the rotation member is in a material joint manner connected to both adjacent pulleys;

the FIG. 3d a sectional view of an engaging body of a third embodiment of the invention along the line C-C in FIG. 3a, whereby the rotation member is in a form joint manner connected to both adjacent pulleys via a parallel key;

the FIG. 3e a sectional view of an engaging body of a third embodiment of the invention along the line C-C in FIG. 3a, whereby the rotation member is in a friction force joint manner connected to both adjacent pulleys via the flat belt, which is in engagement with the rotation member, by means of the static friction between the respective flat belt tension cord and the respective pulley working surface along the winding circumference between the respective flat belt tension cord and the respective pulley working surface;

the FIG. 3f a sectional view of an engaging body of a third embodiment of the invention along the line C-C in FIG. 3a, whereby the rotation member is in a controllable form joint manner connected to both adjacent pulleys via a pulling wedge gear and a pair of parallel keys of medium length;

the FIG. 3g a flat belt portion of a third embodiment of the invention from the viewing direction Z in FIG. 3a;

the FIG. 3h a sectional view of a flat belt portion of a third embodiment of the invention along the line F-F in FIG. 3g;

the FIG. 3i a partial sectional view of a modified third embodiment of the invention having three engaging bodies, a single face gear and a flat belt, whereby the three engaging bodies each use a face gear as rotation member, and whereby an engaging body with a rotation member is in engagement with the single face gear;

the FIG. 3j schematically the path of a flat belt of a third embodiment of the invention in a closed construction, whereby the flat belt consists of two endless strips in a layer configuration;

the FIG. 3k schematically the path of a further flat belt of a third embodiment of the invention in a closed construction, whereby the flat belt consists of two layers, and whereby the inner layer is formed of two opened strips, which at the 12:00 o'clock position and at the 06:00 o'clock position abut on each other, and whereby the outer layer is formed of an endless strip;

the FIG. 3m a partial sectional view of an embodiment of the invention having three engaging bodies, a single face gear and a flat belt, whereby the first engaging body uses a rotation member having projections formed as arc shaped flat springs, the second engaging body uses a face gear as rotation member and the third engaging body uses a rotation member having no tooth system, and whereby the engaging body with a rotation member having projections formed as arc shaped flat springs is in engagement with a single standardised face gear according to ISO 53;

the FIG. 3n a top view of a flat belt portion, whereby the end of the shown strip is tapered symmetrically to the length axis of the belt, and whereby the connecting members of the belt strips are enclosed by additional form members formed as arc shaped flat springs;

the FIG. 3p a partial sectional view of a flat belt portion along the line E-E in FIG. 3n, whereby the connecting members of the belt strips are enclosed by additional form members formed as arc shaped flat springs;

the FIG. 3q schematically the generatrix of the series arrangement of apertures at the flat belt by the rolling of a pulley working surface cylinder of the cylindrical engaging body with the above that projecting projections of the rotation member on a flat side of a planely arranged flat belt parallel to its longitudinal direction;

the FIG. 3r a partial sectional view of an embodiment of the invention having four engaging bodies, a single face gear and a flat belt, whereby the four engaging bodies each use a face gear as rotation member and are in engagement with the flat, whereby three of them are located within the endless flat belt and one of them is located outside the endless flat belt, and whereby an engaging body with a rotation member is in engagement with the single face gear;

the FIG. 4 schematically the geometry of the reference profile according to DIN 867;

the FIG. 5 schematically the geometry for the calculation of u(y) and v(y);

the FIG. 6 schematically the geometry for the calculation of u(y*) and v(y*).

LISTING OF REFERENCE SIGNS 100 flat belt
101 aperture
102 connecting member
103 flat belt tension cord
110 strip
111 bevel
121 additional form member
200 rotation member
210 projection
300 pulley
301 annular recess
302 pulley working surface
303 guiding member
400 pulling wedge gear
500 engaging body
600 shaft
601 parallel key, large length
602 parallel key, small length
603 rolling bearing
604 parallel key, medium length
1111 tapered end of strip
1121 additional form member formed as arc shaped flat spring
1201 rotation member formed as standardised face gear according to ISO 53
1202 rotation member formed without tooth system
1203 rotation member having projections formed as arc shaped flat springs
1211 projection formed as tooth of a standardised face gear according to ISO 53
1213 projection formed as arc shaped flat spring
b tooth width of gear tooth system
B tooth width of sprocket tooth system
$b_{eb}$ width of engaging body
$b_0$ width of flat belt
$b_g$ width of guiding member
$b_{ip}$ width of inner pulley
$b_{op}$ width of outer pulley
$b_r$ width of recess
$b_w$ width of pulley working surface
$b_c$ width of flat belt tension cord
c top clearance of tooth system of gear
d pitch circle diameter of sprocket (d=P/sin α=P/sin (π/Z))
d' diameter of pulley working surface cylinder
$d_0$ gear pitch circle diameter
d* origin circle diameter for coordinate y* (d*=P/tan α=P/tan (π/Z))
$d_1$ roller diameter of roller chain
E modulus of elasticity
$e_p$ face gear tooth system pitch circle gap width
$h_{ap}$ gear tooth system addendum
$h_{fp}$ gear tooth system dedendum
$h_p$ whole depth of gear tooth system
$h_{wp}$ working depth of tooth systems of gears
I geometrical moment of inertia
$I_0$ geometrical moment of inertia of a flat belt having a thickness $t_0$
$I_n$ geometrical moment of inertia of a flat belt having a thickness t whereas $t=t_0/n$
k tooth tip height of sprocket tooth system
Linie BB profile reference line of gear tooth system
m gear tooth system modulus
n natural number
p pitch of gear tooth system
P pitch of sprocket tooth system
$s_p$ face gear tooth system pitch circle tooth width
s* sprocket tooth system tooth width at origin circle for coordinate y*
t thickness of a strip of n flat belt strips (=$t_0/n$)
$t_0$ thickness of a flat belt
u perpendicular distance between two in flat belt longitudinal direction succeeding sides of a connecting member
Ü transmission ratio (=$z_1/z_2$ or =$Z_1/Z_2$)
v perpendicular distance between two in flat belt longitudinal direction succeeding sides of a aperture
w width of aperture
y radial height coordinate having origin at gear pitch circle
y* radial height coordinate having origin at circle with diameter d* of sprocket
z gear teeth number
Z sprocket teeth number
α half pitch angle of sprocket tooth system (=π/Z)
$α_p$ half tooth flank angle of gear tooth system (=20°)
β half pitch angle of gear tooth system (=π/z)
γ tooth flank angle of sprocket tooth system
$δ_n$ difference between inner circumference of a strip in n-th layer and inner circumference of a strip in first layer at circular arrangement of the layer configuration
$δ_{gesamt}$ sum of the n single $δ_n$ at a wound up strip having n windings (layers)
$Δ_1$ predetermined clearance in flat belt longitudinal direction
$Δ_2$ predetermined clearance perpendicularly to flat belt longitudinal direction
$Δ_3$ predetermined clearance in flat belt longitudinal direction
$Δ_4$ predetermined clearance perpendicularly to flat belt longitudinal direction
π circle constant
$σ_{zul}$ allowable stress

DESCRIPTION OF EMBODIMENTS

Following a general description of embodiments is firstly given, afterwards a first special embodiment with its dimensions is described in detail and special second and third embodiments as additional embodiments are described.

At the general description of embodiments in a first step the used components are presented, in a second step the aspects with the construction of embodiments are discussed, then in a third step the fabrication of the components is explained, in a fourth step scopes of embodiments are presented, and finally in a fifth step the operation of embodiments is presented. Thereby is also already referred to the drawings of the special embodiments, whereas the illustrated figures in the drawings serve merely for the demonstration and do not limit the scope of the invention according to the characteristics of the claims and their legal equivalence.

In the figures identical components for the different special embodiments are provided with the same reference signs.

GENERAL DESCRIPTION OF EMBODIMENTS

Description of Components

Generally, the synchronous flat belt drive according to the present invention comprises the following listed components, which also can multiple occur.

Engaging Body

An engaging body 500 comprises n (n=1, 2, 3, . . . ) rotation members 200 and n+1 pulleys 300, whereas a single rotation member 200 is positioned between a pair of coaxial pulleys 300 coaxially to this pair, and whereas a pulley 300 positioned at the sides of a engaging body comprises an annular recess 301, a pulley working surface 302 and a guiding member 303 along the pulley circumference, and a pulley 300 positioned in the inner part of a engaging body between a pair of rotation members 200 comprises in a symmetrical arrangement two annular recesses 301 and in between a pulley working surface 302, and whereas the width of an engaging body 500 (without friction discs) is defined by the following relationship:

$$b_{eb} = n \cdot b + (n+1-2) \cdot b_{ip} + 2 \cdot b_{op}$$

With an engaging body 500 the n rotation members 200 can be connected to an adjacent pair of pulleys 300 material joint (see FIGS. 1c, 2c and 3c), form joint (see FIGS. 1d, 2d and 3d), friction joint (see FIGS. 1e, 2e and 3e), controllably form joint (see FIGS. 1f, 2f and 3f), and controllably friction joint (not pictured), whereas at of a shaft 600 only one connecting type used is, and whereas the different connecting types of engaging bodies 500 can be used with a synchronous flat belt drive in different combination and number, driving or driven, clockwise rotating or counter clockwise rotating, as part or as no part of a tensioning device, as tensioning pulley with or without tooth system 210 at the at least one rotation member 200, having small or large diameters, at both flat sides of a opened or closed flat belt 100 in engagement with a flat belt 100.

Tensioning Pulley

A cylindrical tensioning pulley is formed as part of a tensioning device of the synchronous flat belt drive according to a cylindrical engaging body 500, whereas the n rotation members 200 are formed with or without a tooth system 210.

Rotation Members

A rotation member 200 for example can be formed as standardised face gear, for example with an evolvental gear tooth system for meshing with the reference profile according to DIN 867 respectively ISO 53 or as a standardised sprocket having a tooth system according to DIN 8196 for engaging in roller chains according to DIN 8187 and DIN 8188.

Pulley

The diameter of a pulley working surface cylinder of a pulley 300 for example can be formed greater or equal to a gear pitch circle diameter and less than a gear tip circle diameter of a rotation member 200 formed as a gear, whereas the pulley 300 has a predetermined width.

Further a pulley 300 adjacent to a rotation member 200 can have a annular recess 301 coaxially arranged to a pulley axis, which begins axially to a pulley axis at a pulley side wall and ends in a predetermined distance to this side wall, and begins radially to the pulley axis at a predetermined radial height and ends at the circumferential surface of a pulley 300.

Adjacent to this annular recess 301 a pulley 300 comprises a cylindrical pulley working surface 302, having of an axial width for example less or approximately equal to the width of a flat belt cord 103.

And further a pulley 300 positioned to one side of an engaging body 500 can comprise on its circumferential surface adjacent to a longitudinal side of a flat belt 100 along of the pulley circumference a lateral guiding member 303 for the flat belt 100.

Flat Belt

A flat belt 100 comprises a pair of flat sides, a pair of longitudinal sides, n series arrangements of apertures 101, and n+1 flat belt tension cords 103. It is formed in an endless or opened construction with at least one single strip 110 in a layer configuration of at least one layer, whereas the individual strips 110 are arranged in a layer with their ends overlapping, abutting or with distance to each other, and whereas a single strip 110 also forms several layers, whereas it is wound up or folded, and whereas also a single strip 110 is as an endless strip 110 part of a layer configuration.

In this manner a flat belt 100 can be formed of several very thin strips 110, whereas for example with thin metal strips 110 a particularly distinctive material hardening by cold rolling can be achieved. Consequently as a result a flat belt 100 consisting of several very thin metal strips 110 can have a clearly higher tensile strength as a flat belt 100 of a single metal strip 110 having a thickness equal the sum of the thicknesses of the single metal strips 110.

Furthermore a flat belt 100 formed of several very thin metal strips 110 can be formed having a clearly lower bending stiffness E·I as a flat belt 100 of a single metal strip 110 having a thickness equal to the sum of the thicknesses of the single metal strips 110. For with a rectangular strip cross section having a width equal to the width $b_0$ of a flat belt 100 and a thickness $t = t_0/n$ (n=2, 3, 4, . . . ), whereas $t_0$ is the thickness of the flat belt 100 and n is the number of the strips of a flat belt 100, one obtains for a geometrical moment of inertia of a strip 110 (with n strips 110 of a flat belt 100)

$$I_n = b_0 \cdot (t_0/n)^3 / 12;$$

in comparison to this amounts the geometrical moment of inertia of a flat belt 100 of a single metal strip 110 having a thickness $t_0$ equal of the sum of the thicknesses of the single metal strips 110

$$I_0 = b_0 \cdot t_0^3 / 12;$$

further amounts the total geometrical moment of inertia of a flat belt 100 of n strips $$I = n \cdot I_n = n \cdot b_0 \cdot (t_0/n)^3 / 12 = I_0/n^2$$

this means, is a flat belt 100 with identical total thickness $t_0$ produced instead of a single strip 110 of for example 10 strips 110 (n=10), then has this flat belt 100 a lower bending stiffness by the factor 100 with else identical modulus of elasticity E.

Overall one obtains thus by forming the flat belt 100 instead of a single strip 110 of several single strips 110 in a layer configuration at identical thickness of the flat belt 100 a higher tensile strength and a clearly lower bending stiffness, whereby at a cycle a very low deformation energy has to be spent.

Further a flat belt 100 supports along a winding circumference between a flat belt 100 and a cylindrical engaging body 500 radially to the axis of a pulley working surface cylinder essentially only on a pulley working surface 302, and the flat belt supports along a winding circumference between a flat belt 100 and a cylindrical engaging body 500 on a rotation member 200 essentially only tangentially to a pulley working surface cylinder.

And further the generatrix of the series arrangement of apertures 101 on the flat belt 100 is the rolling of a pulley working surface cylinder of a cylindrical engaging body 500 with the beyond projecting projections 210 of a rotation member 200 on a flat side of a planely arranged flat belt 100 parallel to its longitudinal direction.

Further the perpendicular distance between two in longitudinal direction of the flat belt 100 succeeding sides of a connecting member 102 at an engagement of a flat belt 100 with its series arrangement of apertures 101 with a rotation member 200, which is formed as a standardised face gear having an evolvental gear tooth system for meshing with the reference profile according to DIN 867 respectively ISO 53, for a radial engagement height region, at which the radial height is defined by the radial coordinate y, whose origin is positioned at the pitch circle diameter $d_0$ of the gear, and which is defined within following boundaries:

$$0 \leq y < h_{ap}$$

$$u(y)=(m\cdot\pi)/2+(2\cdot\pi\cdot y)/z+2\cdot y\cdot tan\ \alpha_p-\Delta_1$$

and the perpendicular distance between two in longitudinal direction of the flat belt 100 succeeding sides of an aperture 101 for the same height region is defined by the following relationship:

$$v(y)=(m\cdot\pi)/2-2\cdot y\cdot tan\ \alpha_p+\Delta_1$$

and the perpendicular distance between two perpendicularly to the longitudinal direction of the flat belt 100 succeeding sides of an aperture 101 for the same height region is defined by the following relationship:

$$w=b+\Delta_2$$

And further the perpendicular distance between two in longitudinal direction of the flat belt 100 succeeding sides of a connecting member 102 at an engagement of a flat belt 100 with its series arrangement of apertures 101 with a rotation member 200, which is formed as a standardised sprocket having a tooth system according to DIN 8196 for engaging with roller chains according to DIN 8187 and DIN 8188, for a radial engagement height region, at which the radial height is defined by the radial coordinate y*, whose origin lies at a circle of the gear, whose diameter d* satisfies the following relationship:

$$d^*=P\cdot cot\ \alpha$$

and which is defined within the following boundaries:

$$0 \leq y^* < k$$

is defined by the following relationship:

$$u(y^*)=P\cdot(\alpha\cdot cot\ \alpha-1)+d_1+2\cdot\alpha\cdot y^*+2\cdot y^*\cdot tan\ \gamma-\Delta_3$$

and the perpendicular distance between two in longitudinal direction of the flat belt 100 succeeding sides of an aperture 101 for the same height region is defined by the following relationship:

$$v(y^*)=P-d_1-2\cdot y^*\cdot tan\ \gamma+\Delta_3$$

whereas y for example satisfies the following relationship:

$$16° \leq \gamma \leq 22.5° \text{ or } 13° \leq \gamma \leq 17°$$

and the perpendicular distance between two perpendicularly to the longitudinal direction of the flat belt 100 succeeding sides of an aperture 101 for the same height region is defined by the following relationship:

$$w=B+\Delta_4$$

Shaft

A shaft 600 can comprise for example a long parallel key 601, or n short parallel keys 602 and n+1 rolling bearing 603, or n controllable pulling wedge gear 400 and n+1 parallel keys 604 of medium length.

Face Gears in Direct Engagement with an Engaging Body

Furthermore at particular applications the synchronous flat belt drive can comprise additionally to the above mentioned components at least one single face gear 200.

Additional Form Members

The for example bushing shaped additional form members 121 mounted on at least one connecting member 102, which enclose a connecting member, can have a cross section for example in shape of a circle, of a "0" or of a "8".

Construction of Components

Subsequent the construction of the individual components is described.

Parameters

The essential determining parameters for the material selection for the individual components and for the dimensioning of the individual components are: the transmission ratio between the individual engaging bodies 500, the magnitude of the torque to be transmitted, the cycle speed of the flat belt 100, the ambient temperature, the magnitude of the available installation space, the static friction coefficient between the flat belt 100 and the pulley working surface 302, and the type and the extent of the pollution immission by the environment.

Materials

Firstly on basis of the environmental conditions the materials for the individual components are selected, whereas metal materials are particularly suitable for the individual components for use at a high ambient temperature. Alternatively to this can for example a plastic material or a mixed material be used for the components at a low ambient temperature.

The shaft 600 can consist of a tool steel, a stainless steel, or any other suitable material.

The rotation member 200 can consist of a tool steel, a stainless steel, a cast iron material, or any other suitable material.

The pulley 300 can consist of a tool steel, a stainless steel, a cast iron material, or any other suitable material.

The tension layer of the flat belt 100 can consist of single strips 110 having each a different material. Advantageously the strips 110 consisting of metal are cold rolled for increasing the tensile strength. The strips 110 can consist of the metals, X46Cr13, X5CrNi18-10, X4CrNi18-12, X10CrNi18-8, X5CrNiMo17-12-2, X2CrNiMo17-12-2, X2CrNiMo18-14-3, X2CrNiMo18-15-3, X6CrNiMoTi17-12-2, AlCuMg2, AlMg3, AlMgSil, AlZnMgCu, C100, C125W, C70, Ck101, Ck60, Ck67, Ck75, Ck80, CuBe2Pb, CuFe2.5P, CuMg0.3, CuMg0.6, CuNi1.3Si0.25, CuNi12Zn24, CuNi12Zn25Pb1, CuNi15Sn8, CuNi18Zn19Pb1, CuNi18Zn20, CuNi2.0Si0.5Zn1Sn0.5, CuNi2.6Si0.6Zn0.8Sn0.4, CuNi2Be, CuNi30Mn1Fe, CuNi44Mn1, CuNi9Sn2, CuNiBe0.5, CuSn0.2, CuSn0.2Mg0.1Ag, CuSn2Zn10, CuSn3Zn9, CuSn4, CuSn5, CuSn8, CuZn23A13Co, CuZn28, CuZn36, CuZn37, CuZn37Pb2, CuZn38Pb2, DCO1, DCO2, Durinox, Durnico, FeCr20A15, FeNi28Co21, FeNi29Co18, FeNi36, HyMu 80, HyMu 800, Nb, Ni, NiBe2, NiCrl5Fe, NiCr20, NiCu30Fe, NiMo16Cr15W, NiMo28, Phynox, RFe80, Ta, Ti, Zr, CuBe2, CuCo0.5Be, CuCo2Be, CuNi1.2Be, CuSn6, CuFe2P, CuNi2Si, CuNi3Si, CuNi3Si1Mg, CuCrAgFeTiSi, the thermoplastic plastic materials polyamide, polyester, polypropylene, or any other suitable material.

The friction layer can consist of chloroprene rubber, nitrile rubber, fluorine rubber, thermoplastic polyurethane, or any other suitable material. It can be applied at the tension cords 103 of a flat belt or at the pulley working surfaces 302. Alternatively to this, hard material particles can be fixed at the respective surface, such as carbide particles, nitride particles, boride particles or diamond particles. At a wet environment the friction layers at the pulley working surfaces 302 are formed for example motor vehicle tyre profile like (having grooves, holes, fish bone design, etc.) for draining off the fluid.

Rotation Member Type

Now the rotation member type is selected, which is used uniformly at a synchronous flat belt drive, whereas the rotation member type can be for example either a standardised face gear having an evolvental gear tooth system for meshing with the reference profile according to DIN 867 respectively ISO 53, or a standardised sprocket having a tooth system according to DIN 8196 for engaging with roller chains according to DIN 8187 and DIN 8188, and whereas the first type is defined essentially by the modulus m, and the second type essentially by the pitch P of the roller chain.

Pulley Working Surface Cylinder

Before the diameters of the pulley working surface cylinder of the individual engaging bodies 500 are calculated considering the existing series of the standardised face gears or of the standardised sprockets, firstly the minimal allowable diameter of the pulley working surface cylinder has to be determined as function of the modulus of elasticity E of the material of the flat belt, of the allowable stress $\sigma_{zul}$ of the material of the flat belt and of the thickness $t_0$ of the flat belt, whereas the friction layer is not considered for this consideration because of its low modulus of elasticity. According to the Law of Hook it is allowed to specify for the minimal allowable diameter of a pulley working surface cylinder for a circulating flat belt 100:

$$d'_{min\,zul} = 2 \cdot E \cdot t_0 / \sigma_{zul}$$

With a flat belt 100 with a layer configuration one obtains with a thickness t of a single strip 110

$$d'_{min\,zul} \approx 2 \cdot E \cdot t / \sigma_{zul},$$

and with use of the relationship $t = t_0/n$ $$d'_{min\,zul} \approx 2 \cdot E \cdot t_0 / (n \cdot \sigma_{zul})$$

whereas one recognises, that with a flat belt 100 of n strips 110 having a total thickness equal to the total thickness of the flat belt 100 the minimal allowable diameter of a pulley working surface cylinder is 1/n of the minimal allowable diameter of a flat belt 100 without layer configuration having the same total thickness. This means, for a compact construction having relatively small diameters the use of a layer construction for the flat belt 100 is necessary.

Afterwards the diameters of the pulley working surface cylinders of the individual engaging bodies 500 are calculated considering the existing series of the standardised face gears or of the standardised sprockets, whereas for the selection of the modulus m with a face gear or of the pitch P with a sprocket the available installation space, the torque to be transmitted and the wanted transmission ratio are defining, and whereas firstly the smallest diameters d' of a pulley working surface cylinder of an engaging body 500 with a synchronous flat belt drive is defined; and namely with the use of a face gear as a rotation member 200 for example corresponding to the pitch circle diameter $d_0$ according to the relationship $$d' = d_0 = m \cdot z;$$

and with the use of a sprocket as a rotation member 200 for example likewise corresponding to the pitch circle diameter, but here according to the relationship $$d' = d = P/\sin \alpha = P/\sin(\pi/Z);$$

subsequently then the greater diameters with a synchronous flat belt drive corresponding to the wanted transmission ratio Ü according to the relationship $$d'_{groß} = d'_{klein} / \ddot{U}$$

are defined, whereas $$\ddot{U} = z_1/z_2 \text{ oder } \ddot{U} = Z_1/Z_2;$$

Series Arrangement of Apertures with an Engagement with a Standardised Face Gear At a next step then the dimensions of the apertures 101 and of the connecting members 102 of a flat belt 100 are defined on basis of the above selected geometry of the rotation members 200 and the calculated diameter of the pulley working surface cylinder in combination with the predetermined clearance dimensions, whereas with the definition of the clearance dimensions a possibly intended enclosing of the connecting members 102 with for example bushing like additional form members 121 is to consider;

with the selection of a standardised face gear with a evolvental gear tooth system for meshing with the reference profile according to DIN 867 respectively ISO 53 as rotation member 200 the perpendicular distance between two in longitudinal direction of the flat belt 100 succeeding sides of a connecting member 102 is defined by the following relationship:

$$u(y) = (m \cdot n)/2 + (2 \cdot \pi \cdot y)/z + 2 \cdot y \cdot \tan \alpha_p - \Delta_1,$$

whereas the relationship with y=0 (because for example d'=d₀) simplifies to $$u(y)=(m\cdot\pi)/2-\Delta_1; \text{ and}$$

the perpendicular distance between two in longitudinal direction of the flat belt 100 succeeding sides of an aperture 101 is defined by the following relationship:

$$v(y)=(m\cdot\pi)/2-2\cdot y\cdot\tan\alpha_p+\Delta_1,$$

whereas the relationship with y=0 simplifies to $$v(y)=(m\cdot\pi)/2+\Delta_1.$$

and the perpendicular distance between two perpendicularly to the longitudinal direction of the flat belt 100 succeeding sides of an aperture 101 is defined by the following relationship:

$$w=b+\Delta_2,$$

whereas the standard gives no values for the width b of a face gear; approximately the width b is formed for example as great as the width of a pulley working surface.

Series Arrangement of Apertures with an Engagement with a Standardised Sprocket At the selection of a standardised sprocket having a tooth system according to DIN 8196 for engaging with roller chains according to DIN 8187 and DIN 8188 as rotation member 200 the perpendicular distance between two in longitudinal direction of the flat belt 100 succeeding sides of a connecting member 102 is defined by the following relationship:

$$u(y^*)=P\cdot(\alpha\cdot\cot\alpha-1)+d_1+2\cdot\alpha\cdot y^*+2\cdot y^*\cdot\tan\gamma-\Delta_3,$$

whereas $$y^*=d/2-d^*/2 \text{(because for example } d'=d),$$

$$d=P/\sin\alpha,$$

$$d^*=P\cdot\cot\alpha,$$

$$\alpha=\pi/Z,$$

$$\gamma=19°\text{(for example)};$$

and the perpendicular distance between two in longitudinal direction of the flat belt 100 succeeding sides of an aperture 101 is defined by the following relationship:

$$v(y^*)=P-d_1-2\cdot y^*\cdot\tan\gamma+\Delta_3,$$

whereas the roller diameter $d_1$ for the corresponding pitch P is taken from the table book of the standard;
and the perpendicular distance between two perpendicularly to the longitudinal direction of the flat belt 100 succeeding sides of an aperture 101 for the same height region is defined by the following relationship:

$$w=B+\Delta_4,$$

whereas several values are possible for the width B of a sprocket according to the standard; approximately the width B is formed for example as great as the width of a pulley working surface 302.

Standard Series

With the above mentioned relationships one can create a table book, by which then with the given geometry of the standardised face gears respectively the standardised sprockets the geometry of the series arrangement of apertures 101 on the flat belt 100 and the geometry of the pulleys 300 can be defined easily. Such a table book is necessary for a commercial standardised worldwide use of the invention.

Subsequently two tables are created exemplarily, at which the values for u, v and d' each are assigned to the geometry values of standardised face gears according to DIN 867 (ISO 53) respectively of standardised sprockets according to DIN 8196 for engaging with roller chains according to DIN 8187 and DIN 8188.

Consequently one obtains with standardised face gears according to DIN 867 (ISO 53) for u, v, and d' with specification of m, z and $\Delta_1$ the values according to table 1.

TABLE 1

| m [mm] | z | $\Delta_1$ [mm] | u [mm] | v [mm] | d' [mm] |
|---|---|---|---|---|---|
| 5.00 | 10 | 1.00 | 6.85 | 8.85 | 50.00 |
| 5.00 | 15 | 1.00 | 6.85 | 8.85 | 75.00 |
| 5.00 | 20 | 1.00 | 6.85 | 8.85 | 100.00 |
| 5.00 | 25 | 1.00 | 6.85 | 8.85 | 125.00 |
| 5.00 | 30 | 1.00 | 6.85 | 8.85 | 150.00 |

And further one obtains with standardised sprockets according to DIN 8196 for engaging with roller chains according to DIN 8187 and DIN 8188 for u, v, and d' with specification of P, $d_1$, $\gamma$, Z, and $\Delta_3$ the values according to table 2.

TABLE 2

| P [mm] | $d_1$ [mm] | Y [rad] | Z | $\Delta_3$ [mm] | u [mm] | v [mm] | d' [mm] |
|---|---|---|---|---|---|---|---|
| 15.88 | 10.16 | 0.33 | 10 | 1.00 | 10.29 | 5.85 | 51.40 |
| 15.88 | 10.16 | 0.33 | 15 | 1.00 | 10.24 | 5.90 | 77.10 |
| 15.88 | 10.16 | 0.33 | 20 | 1.00 | 10.29 | 5.85 | 102.80 |
| 15.88 | 10.16 | 0.33 | 25 | 1.00 | 10.38 | 5.76 | 128.50 |
| 15.88 | 10.16 | 0.33 | 30 | 1.00 | 10.49 | 5.65 | 154.20 |

As is evident in the table 2, the values for u and v are different at the individual numbers of teeth Z. This results from the above mentioned relationships for u and v, whereas the sum of u and v each results 16.14 mm, thus the pitch on the flat belt is equal for the different numbers of teeth. With a fabrication naturally only one value can be selected for u and v for a flat belt 100, which runs over several engaging bodies 500 having different diameters. Therefore in this series u 10.24 mm (the smallest value of the series) is selected, and for v=5.90 mm (the greatest value of the series). Furthermore the value for d' was defined only for Z=10 from the relationship d'=d=P/sin α=P/sin (π/Z). For the higher values of Z d' was defined from the relationship d'$_{groß}$=d'$_{klein}$/Ü whereas U=$Z_1$/$Z_2$ is.

Cross Section of the Tension Cords

Subsequently to this the necessary cross section of the tension cords 103 is defined corresponding to the torque to be transmitted, whereas this cross section is formed depending on the existing installation space either by several side by side arranged tension cords 103 and therewith also pulleys 300, for example three pulleys 300 with two rotation members 200, or the necessary cross section is formed with a small installation space in axial direction of a shaft 600 of an engaging body 500 only by the minimal number of two tension cords 103 and therewith also two pulleys 300 with one rotation member 200, in the latter case then the thickness of a tension cord 103 and therewith of a flat belt 100 has to be selected correspondingly greater, whereas advantageously the flat belt thickness is formed by a layer of single strips 110 for reduction of the bending stiffness.

Geometry of a Pulley

On the basis of the above conducted dimensioning of a flat belt tension cord 103 now the width of a pulley working surface 302 can be defined; it should be less than or approximately equal to the width of a flat belt tension cord 103.

It should be less than the width of a flat belt tension cord 103 particularly then, when bushing like additional form members 121 are mounted at connecting members 102 of a flat belt 100. For, then a projecting of a flat belt tension cord 103 beyond the circular edge, limiting a pulley working surface 302 on the side facing a rotation member 200, should prevent, that an additional form member 121 slides along the side of a pulley 300 facing the a rotation member 200.

Further a recess 301 shall be provided at the side of a pulley facing a rotation member 200; this recess 301 serves for reception of a bushing like additional form member 121 mounted at a connecting member 102, which on both sides of a rotation member 200 projects, because an aperture 101 and therewith also a connecting member 102 is formed wider than the tooth system of the rotation member 200 by a clearance $\Delta_2$ or $\Delta_4$, to enable, that a tooth 210 of a rotation member 200 can engage with a aperture 101 of a flat belt 100 with a lateral clearance ($\Delta_2/2$ or $\Delta_4/2$) on both sides of a rotation member 200, whereby a damaging of the flat belt 100 by an engaging tooth 210 of a rotation member 200 is prevented, whereas a necessary condition for this failure free engagement of a tooth 210 of a rotation member 200 with an aperture 101 with a lateral clearance ($\Delta_2/2$ or $\Delta_4/2$) a approximately clearance free guidance of the flat belt 100 is by the lateral guiding members 303 in axial direction to the axis of the engaging body 500.

Connection of Rotation Member, Pulley and Shaft

The n rotation members 200 and the n+1 pulleys 300 can be connected directly or via the shaft 600 material jointly, form jointly, friction jointly or controllably form jointly or friction jointly.

Thereby a material joint is created, as the n rotation members 200 with the n+1 pulleys 300 form an engaging body 500 made in one piece, which is then connected to the shaft 600 form jointly for example via a groove and parallel key connection 601, or is connected to the shaft 600 controllably form jointly for example via a pulling wedge gear 400.

Thereby a form joint is created, as both the n rotation members 200 and the n+1 pulleys 300 are connected to a shaft 600 for example via a groove and parallel key connection 601.

Thereby a friction joint is created, as for example both the n rotation members 200 and the n+1 pulleys 300 are connected to a shaft 600 via a press fit.

Thereby a controllable form joint is created, as the n+1 pulleys 300 are connected to a shaft 600 for example via a groove—and parallel key connection 604, and as the n rotation members 200 are connected controllably form jointly to the shaft 600 for example via a pulling wedge gear 400.

Thereby with specific uses a controllable form joint is created only between the n rotation members 200 and a shaft 600, as the n+1 pulleys 300 are supported rotatably by a shaft 600 for example on rolling bearings 603, and as the n rotation members 200 are connected controllably form jointly to a shaft 600 for example via a pulling wedge gear 400.

Thereby a controllable friction joint (not pictured) is created, as n+1 pulleys 300 connected for example axially displaceably to the shaft 600 each have friction layers at the side walls directly adjacent to a rotation member 200, whereas these 2·n friction layers press in static condition by means of spring force to adjacent side walls of the n rotation members 200, which are rotatably supported by the shaft 600. Thereby a friction joint is created between the n+1 pulleys 300 and the n rotation members 200, whereas by means of a device the effect of the spring force can be controllably suspended, and therewith also the achieved friction joint.

Thereby further a controllable friction joint (not pictured) is created, as for example each in the space between a pulley 300 connected axially displaceably to the shaft 600 and an adjacent rotation member 200 a thin circular friction disc is arranged coaxially to the shaft 600 having a friction coating at both sides, whereas these 2·n friction discs press in static condition by means of spring force to adjacent side walls of the n rotation members 200, which are rotatably supported by the shaft, and the n+1 pulleys 300, and thereby a friction joint is created between the n+1 pulleys 300 and the n rotation members 200 via the 2·n friction discs, and whereas by means of a device the effect of the spring force can be controllably suspended, and therewith also of the achieved friction joint.

Thereby further a controllable friction joint (not pictured) is created, as for example each in the space between a pulley 300 connected axially displaceable to the shaft 600 and an adjacent rotation member 200 a thin circular friction disc is arranged coaxially to the shaft 600 having a friction coating at both sides, whereas these 2·n friction discs controllably press by the effect of at least one electromagnet arranged in a rotation member 200 and/or in a pulley 300 to adjacent side walls of the n rotation members 200, which are rotatably supported by the shaft, and the n+1 pulleys 300, and thereby a controllable friction joint is created between the n+1 pulleys 300 and the n rotation members 200 via the 2·n friction discs.

The creating of the controllable form joint between a shaft and a rotation member, or of the controllable friction joint between a rotation member and a pulley can happen by mechanical, hydraulic, pneumatic, or electromagnetic actuation of the coupling members.

Forming of the Flat Belt

Further an endless flat belt 100 is formed, whereas the operation temperature, the installation space and the torque to be transmitted define the embodiment of the endless flat belt 100, and whereas the here mentioned construction principles also can be analogously applied with a construction of an opened flat belt 100.

Whereas the flat belt 100 is constructed for example for a double sided engagement of an engaging body 500, and therefore normally comprises a tension layer, two friction layers arranged each at the opposing sides of a tension layer, and for example with a high load additional form members 121.

And whereas a tension layer consists depending on temperature and load at least of a single strip 110 of for example plastic material or of a cold rolled metal alloy.

And whereas for forming of a tension layer with an endless flat belt 100 at least one endless strip 110 serves, which forms a layer, and/or at least one opened helical wound up strip 110, which can form also several layers, whereas with consisting of the tension layer of both types, these types can be arranged one upon the other in every possible combination, for example firstly one endless strip 110, above that one opened helical wound up strip 110, and above that one endless strip 110, or firstly two endless strips 110, above that one opened helical wound up strip 110, and above that two endless strips 110, or firstly one opened helical wound up strip 110, above that two endless strips 110, and above that one opened helical wound up strip 110, etc.

And whereas for forming of a tension layer with an endless flat belt 100 at least a single endless strip 110 serves, which forms one layer, and/or several overlapping opened strips 110, which also can form several layers, whereas the length of the opened strips 110 can be clearly shorter than the length of the endless flat belt 100.

And whereas for example with forming of an endless tension layer of a wound up strip 110 only the outside located end can be firmly connected to the directly under that adjacent strip section, and the others inside located windings can be floatingly supported, this means, having a low free moving space in circumference direction of the endless tension layer.

And whereas for example with forming of an endless tension layer of a single endless strip 110 and several opened strips 110 the opened strips 110 can be marginally shorter than the endless strip 110 and can be arranged inside of the endless strip 110, and the endless strip 110 and the opened strips 110 can be connected firmly to each other only at one position, and otherwise the opened strips 110 can be floatingly supported, this means, having a low free moving space in circumference direction of the endless tension layer. And whereas for example the configuration with four layers can be constructed as follows: an endless strip 110 outside (fourth layer), three opened strips inside (first until third layer) and marginally shorter than the endless strip 110, form joint connection of the four layers (riveted bolt connection) or material joint connection of the four layers (line like welding connection perpendicularly to the longitudinal axis of the flat belt) at the 7 o'clock position of the circularly aligned tension layer at a connecting member 102, the ends of the innermost opened strip 110 (first layer) at the 1 o'clock position, the ends of the strip 110 (second layer) adjacent to the innermost strip 110 in 11 o'clock position, and the ends of the strip 110 (third layer) adjacent to the endless outer strip 110 in 3 o'clock position.

For forming of an endless tension layer of a layer configuration having individual strips 110 there are two possibilities, the first is, firstly to form the layer configuration, and then to produce the series arrangement of apertures 101. With the second possibility firstly the series arrangement of apertures 101 is produced at the individual strips 110, and then an endless tension layer is formed of these individual strips 110.

In particular with the second possibility the different length of the strips 110 is to consider at circular arrangement of the tension layer in the individual layers. And namely results as difference between the inner circumference of a strip 110 in the n-th layer (n=1, 2, 3, . . . ) and the inner circumference of a strip 110 in the first layer (n=1) at circular arrangement of the layer configuration $$\delta_n = 2 \cdot \pi t \cdot (n-1),$$

whereas t is the thickness of a strip 110.

At a wound up strip 110 for forming of a circular layer configuration these individual length differences are added, so that one obtains here as overall length difference $$\delta_{gesamt} = n \cdot \pi \cdot t \cdot (n-1).$$

This means, a wound up strip 110 having n complete layers is by the amount $\delta_{gesamt}$ longer than the n-th multiple of the circumference of the first layer. From this it follows with a series arrangement having a pitch, which is exactly fitting for the first layer (this means, the length of the inner circumference of the strip 110 in the first layer is equal to a integer multiple of the pitch of the strip 110), that the further the wound up strip 110 reaches to above that located layers, the greater is the displacement of the apertures 101, then they are not further exactly overlapping. For example one obtains with four layers (n=4) and a thickness of the strip 110 in the amount of 0.1 mm a overall displacement $\delta_{gesamt}$ in the amount of 3.77 mm.

With this manner of manufacturing the above described displacement is naturally to consider when defining the clearance values for the apertures 101. Therefore the predetermined clearance in longitudinal direction of the flat belt 100 with an aperture 101 ($\Delta_1$ or $\Delta_3$) should be approximately double the size of $\delta_{gesamt}$.

This displacement can be reduced, when the already preblanked strips 110 are not wound up, or not as often.

A possible arrangement might be: one endless strip 110 inside (first layer), three opened strips 110 outside (second until fourth layer) and equal as long as the endless inner strip 110, form joint connection of the four layers (riveted bolt connection) or material joint connection of the four layers (line like welding connection perpendicularly to the longitudinal axis of the flat belt) at the 7 o'clock position of the circularly aligned tension layer at a connecting member 102, whereas at this connection position the connecting members 102 of the strips 110 of the individual layers are exactly positioned one upon the other, thus have no displacement, and further the ends of the strip 110 in the second layer at the 1 o'clock position, the ends of the strip 110 in the third layer in the 11 o'clock position, and the ends of the outer strip 110 in the fourth layer in the 3 o'clock position. With this configuration having t=0.1 mm the maximal displacement in the second layer amounts $\Delta_2/2$ (=0.31 mm), the maximal displacement in the third layer $8 \cdot \Delta_3/12$ (=0.84 mm), and the maximal displacement in the fourth layer $8 \cdot \Delta_4/12$ (=1.26 mm).

With the first possibility for forming of an endless tension layer, which is, firstly to form the layer configuration, and then to make the series arrangement of apertures 101, so far surprisingly this displacement problem could not be detected.

Forming of Additional Form Members

Further additional form members 121, which at least one connecting member 102 of this endless flat belt 100 enclose, can be formed for example bushing shaped, whereas they can be formed with or without longitudinal slot, and whereas they can be manufactured of metal, plastic material, mixed material or other material, and can be formed for example also in shape of a spiral spring, and whereas the length of the bushing for example is marginally less than the width of an aperture 101, and whereas the cross section of the additional form member 121 can have for example two perpendicularly to each other arranged symmetry axes, and the cross section can have for example the form of a circle, of a "0" or of a "8", whereas respectively the lower and upper arc of the "0" and of the "8" can be circular arc shaped, each with a radius approximately equal to the half of the perpendicular distance between two in longitudinal direction of the flat belt 100 succeeding sides of a connecting member 102, whereas the longitudinal axes of the "0" and of the "8" are aligned parallel to a flat side of the flat belt 100 in a straightened region of the flat belt 100, and are aligned essentially tangentially to the pulley working surface cylinder along a winding circumference between a flat belt 100 and a cylindrical engaging body 500, whereas the bushing shaped additional form member 121 with a circular cross section has a longitudinal slot across its total length for receiving of the connecting member 102, whereas the slot is aligned parallel to the longitudinal axis of the bushing shaped additional form member 121, and whereas the perpendiculars of the facing pair of slot faces are aligned parallel to each other, and whereas the perpendiculars of the facing pair of slot faces form an angle of approximately 45° to a plane, which spans between a inner slot edge and the longitudinal symmetry axis of the bushing shaped additional form member 121, and whereas the bushing shaped additional form member 121 with a cross section in shape of a "0" and of a "8" has a longitudinal slot across its total length, whereas with the cross section shape of a "8" the slot runs along the longitudinal symmetry axis of the bushing shaped additional form member 121, and whereas with the cross section shape of a "0" the slot runs at a flattened side parallel to the longitudinal symmetry axis of the bushing shaped additional form member 121, whereas the perpendiculars of the facing pair of slot faces are aligned parallel to each other, and whereas the perpendiculars of the facing pair of slot faces are aligned parallel to a tangential plane of a flattened side.

And whereas additional form members 121, which enclose at least one connecting member 102 of this endless flat belt 100, can be also plate shaped, and can be for example components of a strip 110, for example, as when blanking of the apertures 101 of a strip 110 with at least one aperture 101 the portion to be blanked, for example divided symmetrically in a direction perpendicularly to the longitudinal side of a flat belt 100, remains connected to the in longitudinal direction of the flat belt succeeding sides of a connecting member 102, whereas then for example a portion can partially cover at least one above that located connecting member 102 of adjacent strips 110, after being correspondingly bent over, and whereas then for example the other portion can partially cover at least one under that located connecting member 102 of adjacent strips 110, after being correspondingly bent over, or whereas for example both portions connected to a connecting member 102 can partially cover at least one above that located connecting member 102 of adjacent strips 110, after being correspondingly bent over, or for example can partially cover at least one under that located connecting member 102 of adjacent strips 110, after being correspondingly bent over, and whereas several so supplemented connecting members 102 in a series arrangement, for example each can partially cover at least one above that located connecting member 102 of adjacent strips 110, after being correspondingly bent over, and whereas several so supplemented connecting members 102 in a series arrangement, for example each can partially cover alternately at least one above that located connecting member 102 of adjacent strips 110, and afterwards at least one under that located connecting member 102 of adjacent strips 110, and so on.

And whereas additional form members 121, which enclose at least one connecting member 102 of this endless flat belt 100, can be also strip shaped, whereas they are spirally wound around at least one connecting member 102.

And whereas additional form members 121 can be formed also in another form, with which they do not enclose a connecting member 102.

And whereas by fixing of an additional form member 121 at a connecting member 102 for example the bending stiffness around an axis perpendicularly to the longitudinal axis of the flat belt 100 is not changed, and when circulating around an engaging body 500 a connecting member 102 can align as circular arc shaped, as the flat belt tension cord elements 103 adjacent at both sides and radially supporting on the respective pulley working surfaces 302, so that between these adjacent flat belt tension cord elements 103 and the connecting member 102 no 30, material fatiguing bending stresses can be generated by a different curve when circulating around an engaging body 500.

Forming of the Friction Combinations

Further the friction combinations between the flat belt tension cords 103 and the pulley working surfaces 302 are formed.

Whereas with a dry environment in a temperature region until 200° C. the friction layers of the flat belt tension cords 103 are formed of a natural rubber or a thermoplastic polyurethane correspondingly to the maximal temperature, whereas the tension layer consists of a cold rolled steel alloy or of a plastic material correspondingly to the maximal temperature, and whereas the surfaces of the pulley working surfaces 302 consist of a steel material or of a cast iron material or of a plastic material correspondingly to the maximal temperature.

And whereas alternatively to this with a dry environment in a temperature region until 200° C. the surfaces of the pulley working surfaces 302 are formed of a natural rubber or of a thermoplastic polyurethane correspondingly to the maximal temperature, whereas the tension layer consists of a cold rolled steel alloy or of a plastic material correspondingly to the maximal temperature, and whereas no friction layers are formed at the flat belt tension cords 103.

And whereas with a dry environment having an operation temperature over 200° C. the flat belt tension cords 103 with a cold rolled steel alloy as tension layer are formed with carbide particles, nitride particles, boride particles or diamond particles as friction elements instead of having a friction layer, and the surfaces of the pulley working surfaces 302 of a steel material or of a cast iron material.

And whereas alternatively to this with a dry environment having an operation temperature over 200° C. the flat belt tension cords 103 with a cold rolled steel alloy as tension layer are formed without friction elements, and the surfaces of the pulley working surfaces 302 of a steel material or of a cast iron material having carbide particles, nitride particles, boride particles or diamond particles.

And whereas with a wet environment (water, oil, etc.) the friction layers at the pulley working surfaces are formed for example motor vehicle tyre profile like (having grooves, holes, fish bone design, etc.) for draining off of the fluid.

Embodiments of the Flat Belt

Until an operation temperature of 100° C. and a low load the endless flat belt 100 is formed for example of an endless strip 110 of polyamide as tension layer having two friction layers of chloroprene rubber.

Until an operation temperature of 100° C. and a medium load the endless flat belt 100 is formed for example of several endless strips 110 of a cold rolled steel alloy as tension layer, whereas the several endless strips 110 are welded line like to each other perpendicularly to the longitudinal axis of the flat belt 100 at selected equally spaced connecting members 102 for example by resistance welding roll seams, and provided with two friction layers of nitrile rubber.

Until an operation temperature of 100° C. and a high load the endless flat belt 100 is formed for example of an opened wound up strip 110 having several winding layers of a cold rolled steel alloy as tension layer, whereas the winding layers are welded line like to each other perpendicularly to the longitudinal axis of the flat belt 100 at selected equally spaced connecting members 102 for example by resistance welding roll seams, and provided with two friction layers of nitrile rubber, and with additional form members 121 for example in the form of a "8".

Until an operation temperature of 200° C. and a low load the endless flat belt 100 is formed for example of an endless strip 110 of a cold rolled steel alloy as tension layer and with two friction layers of fluorine rubber.

Until an operation temperature of 200° C. and a medium load the endless flat belt 100 is formed for example of several endless strips 110 of a cold rolled steel alloy as tension layer, whereas the several endless strips are welded line like to each other perpendicularly to the longitudinal axis of the flat belt 100 at selected equally spaced connecting members 102 for example by resistance welding roll seams, and provided with two friction layers of fluorine rubber.

Until an operation temperature of 200° C. and a high load the endless flat belt 100 is formed for example of an opened wound up strip 110 having several winding layers of a cold rolled steel alloy as tension layer, whereas the winding layers are welded line like to each other perpendicularly to the longitudinal axis of the flat belt 100 at selected equally spaced connecting members 102 for example by resistance welding roll seams, and provided with two friction layers of fluorine rubber, and with additional form members 121 for example in the form of a "8".

Over an operation temperature of 200° C. and a low, medium or high load with a corresponding configuration of the tension layer of a cold rolled steel alloy with or without additional form members 121 no friction layers are planned, or carbide particles, nitride particles, boride particles or diamond particles are applied as friction elements.

Forming of the Support of the Engaging Bodies

Further the support of the engaging bodies 500 is formed; the shafts 600 can be two-sided or one-sided rotatably supported according to the composition of the installation space, whereas it is important for a failure free running of the flat belt, that firstly the shafts 600 of a synchronous flat belt drive are aligned parallel to each other, secondly the axis of the pulley working surface cylinder of the respective engaging body is aligned correspondingly to the longitudinal symmetry axis of the respective shaft, and thirdly imaginary straight lines, which form tangents to the circular limitation of the individual pulley working surfaces 302 adjacent to a guiding member 303, span two planes arranged parallel to each other with distance of a width of a flat belt 100.

Whereas for adjusting of the tension of the flat belt 100 a shaft 600 of at least one engaging body 500 is displaceably supported.

Quality Assurance

Before the bulk production can be started with a manufacturing process, it has to be qualified in its individual steps.

After releasing of the bulk production a quality management process accompanying the manufacturing has to be installed for assuring the quality and therewith for achieving of a high reliability of the synchronous flat belt drive. It comprises for example a random sampling like inspection of the material parameters of the raw material, the exact documenting of the individual material supplies for identifying of the producer with retaining of material samples, the stamping of individual serial numbers at the components and their documentation with cross reference to the manufacturing process for a later identification of weak spots in the manufacturing process with product recalls, the investigating of the strips 110 with respect to weak spots by means of a X-ray process, the random sampling like inspecting of the manufacturing tolerances, the random sampling like verifying of the tensile strength of flat belts 100 by means of tension tests, and endurance stress tests with an oscillating load, temperature cycles and a load by corrosion supporting means.

Materials

The materials for the individual components are listed in the section construction.

Pulley

A pulley 300 is brought to the corresponding shape starting with a forged or casted blank by means of a known machining process. With a pulley 300 of a metal material the wanted surface roughness at a working surface can be created by means of a known grinding.

Rotation Member

A rotation member is brought to the corresponding shape starting with a forged or casted blank by means of a known machining process. With a rotation member 200 of a metal material a wanted degree of hardness of the tooth system surface can be created by means of a known surface hardening process.

Shaft

A shaft 600 is brought to the corresponding shape starting with a forged or casted blank by means of a known machining process. With a shaft 600 of a metal material the wanted surface roughness can be created by means of a known grinding. With a pulling wedge gear 400 of a metal material the surfaces of the elements (balls, catches, wedges, etc.), which controllably establish the form joint between shaft 600 and gear 200, are hardened by means of a known surface hardening process.

Engaging Body

An engaging body 500 is formed, as the corresponding number of rotation members 200, pulleys 300, and coupling members by use of corresponding machine elements (parallel keys, rolling bearings, springs, screws, etc.) are mounted at a shaft 600 by means of a known mounting process.

Tensioning Pulley

A tensioning pulley is formed, as the corresponding number of rotation members 200 and pulleys 300 by use of corresponding machine elements (parallel keys, rolling bearings, screws, etc.) are mounted at a shaft 600 by means of a known mounting process.

Face Gears in Direct Engagement with an Engaging Body

A face gear is brought to the corresponding shape starting with a forged or casted blank by means of a known machining process.

With a face gear of a metal material a wanted degree of hardness of the tooth system surface can be created by means of a known surface hardening process.

Flat Belt

In order to create a strip 110 having blanked holes with a predefined hole pattern, it is known, to discontinuously feed the strip 110 through a hole blanking device. This hole blanking device consists of two plates between which the strip 110 is running through. In the lower plate, which forms the die plate, the blanking holes having keen edges are arranged, whereas the upper plate serves for guiding of the hole dies. For blanking both plates are pressed against each other, so that the strip 110 lying in between is pressed and clamped safely. Afterwards the hole dies are pressed downwards, in order to blank the holes in the strip 110 by cooperating with the holes of the lower die plate. After the blanking then the metal plates are removed again from each other, and the strip 110 is pushed on or pulled on by a machining width.

This blanking is discontinuous and therefore relatively slow, the blanking tools are extraordinarily complex and therefore expensive. For blanking of thin strips 110 with film thickness the blanking tools must be manufactured with utmost precision as well as often be regrinded. With the discontinuous movement of a very thin strip 110 for example with film thickness arise also problems in connection with the flatness, the flat pulling through of the strip 110, which necessitates with the movement particular provisions in particular when accelerating and again decelerating, so that it does not fold or crinkle. Also arise particular problems with a discontinuous hole blanking in that an utmost sensitive and precise alignment of the strip 110 becomes necessary with support of probes and precise pushing, in order to achieve, that the distance between two by means of succeeding blankings generated hole series exactly corresponds to the distance, which exists within the hole series, which are generated by means of a single blanking.

With the German utility patent 69017365.1 (Jan. 30, 1992) a device was disclosed, with which a hole blanked metal strip 110 can be economically manufactured. This device for hole blanking of strips 110 of films or sheet metal is characterised by a roughly horizontally lying pair of rolls between which the metal strip 110 is fed through, whereas the upper roll is provided with hole dies, and the lower roll is provided with a coating of an elastic material, in which the hole dies of the upper roll dip with deformation of the coating, as well as by guiding and feeding pulleys for the metal strip 110 arranged upstream and downstream of the pair of rolls, whereas for example the pulleys arranged downstream and/or the rolls are driven.

Such blanking tools can be relatively easily and cheaply manufactured. It is even possible, to exchange the upper roll provided with hole dies for another such roll, if it becomes necessary to sharpen the hole dies or if another hole pattern shall be generated. Thereby an exchange of the lower roll is not necessary. Furthermore this device allows a continuous operating, whereas the feeding velocity is variable within a wide range, and downstream devices for example for winding of the hole blanked strip 110 can be adapted.

For example the hole dies of the upper roll are radially arranged to its rotational axis, so that the blanking respectively dipping of the hole dies in the metal strip 110 and the subjacent deformable coating of the lower roll happens in the form of a rolling—thus the forming of the hole at the metal strip 110 does not happen by simultaneous cutting off the material over its whole circumference, but the material is sheared off, whereby a substantially more finely, more precisely mode of operation happens and a burr forming is largely avoided.

Thereto it is advantageous, that the hole dies of the upper roll dip by roughly half the thickness of the metal strip 110 in the elastomer of the lower roll, whereas the elastomer of the lower roll has for example a Shore hardness of at least 90. In practice this hardness has turned out to be particularly advantageous with the machining of very thin metal strips 110.

Purposively the lower roll, which is coated with the elastomer, has a greater diameter than the upper hole roll. Because of this diameter difference the shear effect is improved when hole blanking, as the hole dies do not meet again and again the same location of the elastomer coating of the lower roll, so that this elastomer coating is evenly stressed over its total surface, and it is easier to carry out an exchange of the upper roll having the hole dies.

Purposively the device is formed such, that the pair of rolls is supported in the opening of a subjacent hopper for catching of the blanking wastes, and thereto advantageously also a driven stripping roll for sticking blanking wastes can be arranged at the lower roll. So it is achieved, that the blanking wastes are safely collected and the risk is eliminated, that blanking wastes affect the succeeding machining stations in any way. Thereto the metal strip 110 can also pass a stripper for further sticking blanking wastes in the range of the hopper opening. Purposively this stripper consists of one or several brushes, which are arranged over and/or below the metal strip 110.

Advantageously guiding and/or pulling pulleys are formed as flattening pulleys or rolls for the hole blanked metal strip 110 downstream of the pair of hole rolls. Advantageously these flattening pulleys or rolls are pressed against each other by means of adjustable pressing means in the form of springs or pressing pistons.

By means of this pair of flattening pulleys or rolls, which purposively is arranged outside of the catching hopper for the blanking wastes, it is assured, that possibly occurred marginal deformations of the metal strip 110 in particular in the range of the holes in the form of projecting burrs are flattened and pressed back to the plane of the fed through metal strip 110, so that at succeeding machining respectively further deforming no obstacles are existent.

Because of the possibility to hole blank metal strips 110 continuously in a wanted manner and very sparing, there is also the possibility directly subsequently in suitable devices to clean these strips 110, to inspect, to cut to a predetermined measure having a correspondingly wanted shape of the ends and to aftertreat in another way.

For example a strip 110, in which the at least one series arrangement of apertures 101 was blanked, again can pass through a roll having hole dies, in order to receive with this second passing through additionally to the apertures 101 a hole pattern having holes evenly distributed over the total surface of the strip. Such a hole pattern can be advantageously, if this strip then with an endless or opened construction for example shall be moulded in polyurethane as friction layer.

The raw material for this machining by a roll having hole dies for manufacturing of strips 110 with at least one series arrangement of apertures 101 are strips 110 normally wound on coils of a different material, for example of metal or plastic material, having a width and thickness, which both correspond for example to the wanted final dimensions.

The roll having hole dies however can provide also thin walled tubes having at least one layer of metal or plastic material with several side by side positioned series arrangements of apertures 101, whereas a thin walled tube having a layer configuration is received by winding of a plate of metal or plastic material about a roll, or by arranging one upon the other of seamless tubes, or by joining of wound tubes and seamless tubes to a tube unit.

And whereas a seamless metal tube is received for example, by pressing together of two parallel terminating head faces of a thin plate, driving with a laser beam along the contacting face in the plane of the contacting face, cooling, grinding of metal projecting beyond the cross section shape of the plate, annealing, cleaning of the surface, rolling, and cutting of the longitudinal sides.

And whereas a seamless plastic material tube is received for example, by pressing together of two parallel terminating head faces of a thin plate, driving with a laser beam along the contacting face in the plane of the contacting face, cooling, grinding of plastic material projecting beyond the cross section shape of the plate, cleaning of the surface, rolling, and cutting of the longitudinal sides.

With the machining of thin walled tubes having at least one layer of metal or plastic material by the roll having hole dies the tube with its whole length is positioned on the lower roll of the device and on at least one adjustable tensioning pulley. After establishing of the necessary tension by means of the tensioning pulley then the movement of the thin walled metal tube for rolling of the roll having hole dies can be effected by a driving tensioning pulley or for example by guiding pulleys pressing and driving outside to the circumference of the lower roll.

The cutting of individual endless strips 110 having at least one series arrangement of apertures 101 can be effected during the blanking or for example with a corresponding second device having rolls and cutting tools after cleaning, inspecting, or any other aftertreating.

Further the strips 110 having at least one series arrangement of apertures 101 also can be manufactured by computer control of static thin plates or of moving thin strips 110 by means of a focused high energy beam, for example a laser beam or a high pressure water beam. Cleaning, inspecting, or any other aftertreating happens after this cutting machining.

Subsequently these opened and/or endless strips 110 of the tension layer can be fixed at themselves and/or at other strips 110 in a material joint manner, for example by welding (also plastic material welding), by soldering (hard soldering or soft soldering), and by bonding, and/or in a form joint manner, for example by fixing of additional form members 121, by moulding in an elastic form stable material after curing or cooling, for example in a thermoplastic polyurethane, whereas in this case the used strips 110 for example are provided with a hole pattern (for penetrating by the compound material), and by rivetting, and/or in a friction joint manner, for example by adhering because of static friction, whereas the static friction of the strips 110 with one another can be increased for example by applying of hard material particles (carbide particles, nitride particles, boride particles or diamond particles) at whose surface, whereas the individual strips 110 also can consist of a different material, and whereas an endless flat belt 100 also only can be formed as tension layer without friction layers.

With consisting of a metal material these opened and/or endless strips 110 of the tension layer can form an endless flat belt 100 in a layer configuration by fixing at themselves and/or at other strips 110 by means of for example resistance welding points, or resistance welding roll seams, or laser beam welding points, whereas a line like at the flat side of the portions of a strip 110 and/or of the strips 110 running welding connection between the portions of a strip 110 and/or between strips 110 is aligned perpendicularly to the longitudinal axis of the flat belt 100, in order to maintain the flexibility of the flat belt 100.

This line like welding connection can join at least two portions of a strip 110 or at least two strips 110, whereas the line like welding connection on at least one connecting member 102 can run along the two in longitudinal direction of the flat belt 100 succeeding sides directly adjacent to these sides, or along the perpendicularly to the longitudinal axis of the flat belt 100 aligned symmetry axis of a connecting member 102 between these sides, and whereas these line like welding connections on at least one connecting member 102 also can extend beyond the range of a connecting member 102 in the range of the tension cords 103.

With the manufacturing of an endless strip 110 of an opened metal strip 110 having overlapping ends for example the roll seam welding process is used. With the roll seam welding process the overlapping ends to be joined of a metal strip 110 are fed through between the both rolls, whereas the rolls are charged with current, for example with alternating current. By means of the current flow through the overlapping two ends of the metal strip 110 between the both welding rolls a melting of the contacting range of the ends of the metal strip 110 happens, whereby a welding seam is formed between the both ends, which joins together the both ends.

For example with the manufacturing of an endless strip 110 of an opened metal strip 110 having overlapping ends the process disclosed in U.S. Pat. No. 3,596,043 (Jul. 27, 1971) is used as roll seam welding process, with which the rolls roll on a strip like wire of a copper alloy, which each is inserted between a roll and a surface of a metal strip 110, whereas the wire is guided in a groove running along the circumference of a roll, and is formed flat at a side facing a metal strip 110.

Further with the manufacturing of an endless strip 110 of an opened metal strip 110 having overlapping ends for example at least one first roll seam is formed within the overlapping range running over the total width of the strip perpendicularly to the longitudinal axis of the metal strip 110, with which an edge of the upper flat strip shaped wire of the upper roll is positioned exactly over an end edge of the upper overlapping metal strip 110, or projects by a small projecting beyond the end edge of this metal strip 110, and a second roll seam is formed within the overlapping range running over the total width of the strip 110 perpendicularly to the longitudinal axis of the metal strip 110, with which an edge of the lower flat strip shaped wire of the lower roll is positioned exactly below an end edge of the lower overlapping metal strip 110, or projects by a small projecting beyond the end edge of this metal strip 110.

With the manufacturing of an endless strip 110 of an opened plastic material strip 110 of the thermoplastic materials polypropylene, polyester, or polyamide having overlapping ends for example the known heating wedge process is used, whereas the welding lines are positioned as above described with the roll seam welding process. As alternative welding process suit also the known friction welding process and the known ultrasonic process.

With the manufacturing of an endless strip 110 of an opened metal strip 110 or a plastic material strip 110 having overlapping ends also welding points can be applied instead of the welding lines within a overlapping range, for example by rod shaped electrodes flattened at the tip with metal strips 110 or by rod shaped heating rods flattened at the tip with plastic material strips 110. And namely such that within the overlapping range a welding point pattern results having evenly distributed welding points.

With the manufacturing of an endless strip 110 of an opened metal strip 110 or a plastic material strip 110 having overlapping ends also riveted bolt connections can be provided instead of the welding lines or the welding points within a overlapping range. For example are the riveted bolts within the overlapping range then each in centre arranged at a connecting member 102, whereas it is to see, that the diameters of the circular holes for receiving of the riveted bolts are marginally greater than the shank diameters of the used riveted bolts with compressed condition. Thereby a damaging of the connecting member 102 is avoided with the compressing. Furthermore a riveted bolt should consist of a relatively soft material, for example of copper. Further for example a round head riveted bolt according to DIN 660 is used, which is introduced from a predetermined side in the centred for example blanked circular hole at a connecting member 102. Afterwards a thin washer having an outer diameter approximately equal to the outer diameter of the head and an inner diameter approximately equal to the diameter of the compressed shank is pushed on the projecting shank until it abuts on the strip 110, and is the soft riveted bolt carefully compressed by use of a fixing tool. The riveted bolt connection used here also can be used in combination with an additional form member. With use of this connection type for example the ends of the strips 110 have on both longitudinal sides from a predetermined distance to the end a taper 111 by a predetermined angle.

The above described welding processes and the riveted bolt process for the manufacturing of an endless strip 110 of an opened plastic material strip 110 or an opened metal strip 110 having overlapping ends also naturally suit for connecting of a layer configuration having more than two layers and also can be used outside of the overlapping range.

Additional Form Members

The additional form members 121, which enclose at least one connecting member 102 of an endless flat belt 100, are formed for example bushing shaped, whereas they can be formed with or without longitudinal slot, and whereas they can be manufactured of metal, plastic material, a mixed material or another material, and can be formed for example also in the form of a spiral spring, and whereas the length of the bushing is for example marginally less than the width of an aperture, and whereas the cross section of the additional form member 121 can have for example two symmetry axes arranged perpendicularly to each other, and the cross section can have for example the shape of a circle, of a "0" or of a "8", whereas each the lower and upper arc of the "0" and of the "8" are circular arc shaped, each having a radius approximately equal to the half of the perpendicular distance between two in the longitudinal direction of the flat belt 100 succeeding sides of a connecting member 102.

The bushing shaped additional form member 121 with a circular cross section has a longitudinal slot over its total length for receiving of the connecting member 102, whereas the slot is aligned parallel to the longitudinal axis of the bushing shaped additional form member 121, and whereas the perpendiculars of the facing pair of slot faces are aligned parallel to each other, and whereas the perpendiculars of the facing pair of slot faces form an angle of approximately 45° to a plane, which spans between an inner slot edge and the longitudinal symmetry axis of the bushing shaped additional form member 121. In this case the additional form member is manufactured for example of a brass tube according to DIN 1755 of CuZn37. The tube can be acquired on the market, and then with a manageable length is provided with the above mentioned longitudinal slot by means of a machining process, whereas the slot width is marginally greater than the thickness of a flat belt tension layer. Afterwards the bushing shaped additional form members 121 are cut off from this piece of tube correspondingly to the wanted length, which is for example marginally less than the width of an aperture 101, and finished. Now they can be positioned on the connecting members 102.

With a cross section in the form of a "0" or of a "8" the bushing shaped additional form members 121 of a metal strip 110 having a width, which is for example marginally less than the width of an aperture 101, for example of the material of the tension layer, are formed by means of a press, whereas with a cross section in the form of a "8" at least one end of the both ends located near by the crossing point of the symmetry axes of the cross section is not yet positioned at its end position, but is distantly arranged from this crossing point, so that this end portion forms an angle of about 60° with the longitudinal symmetry axis of the cross section. Thereby the connecting member 102 of the flat belt 100 can be introduced into the "8", whereas then after this introducing the projecting end is bent to its end position by a blunt tool.

With a cross section in the form of a "0" the bushing shaped additional form member 121 manufactured by the press can be positioned on a connecting member 102 without further machining.

Scopes of Embodiments

The synchronous flat belt drives according to the invention can be used with gear boxes, engines, conveying equipments, etc. as primary drive systems, secondary drive systems, etc. for transmission and transformation of torques and speeds, as switching members for switching between different speed transformations, and as couplings for interrupting of the power flow.

With the synchronous flat belt drives according to the invention any combination of engaging bodies with the different connection types between rotation member and pulley, between rotation member and shaft, between pulley and shaft, and between engaging body and shaft with a construction made in one piece of an engaging body can be used.

Thereby the synchronous flat belt drives according to the invention can be arranged side by side, whereas at least one shaft connection is formed between adjacent synchronous flat belt drives, and/or can be arranged one upon the other, whereas at least one belt connection is formed between adjacent synchronous flat belt drives. Thereby is a three-dimensional directing of the power flow possible.

Further the engaging bodies 500 also can be arranged as planet gears of a planetary gearing, whereas the outer ring gear is formed by an endless flat belt, and the sun gear by an engaging body or a face gear. Thereby several such formed planetary gearings can be arranged one after another, whereas at least one shaft connection is formed between adjacent planetary gearings.

Operation of Embodiments

With operation with the use of metal strips 110 as tension layer damages can early be detected, as for example the conductivity is measured, or the circulating flat belt 100 is contactless inspected for cracks by an eddy current probe.

Further the circulating flat belt 100 can be excited to transversal oscillations by periodic impulses within the system, whereas the answer amplitude of the free oscillating flat belt section the greater is, the closer the excitation frequency is to the natural frequency of the free oscillating flat belt section. Advantageously the fixing of an additional form member 121 here can act as an absorber. For in view of the low mass of the flat belt an additional form member acts as a point mass, which runs through the oscillating flat belt section. During the running through the natural frequency of the flat belt section is permanently changed. Thus the flat belt 100 is permanently disharmonised and can not absorb energy with its natural frequency with a given excitation frequency. So that the amplitude remains limited.

For an operation it is advantageous, that with an even number of teeth of rotation members 200 the number of the apertures 101 at an endless flat belt 100 is uneven, and with an uneven number of teeth of rotation members 200 the number of the apertures 101 at an endless flat belt 100 is even. Thereby the rendezvous frequency between a specific tooth 210 and a specific aperture 101 is reduced and for example a small projecting at an aperture 101 or at a tooth 210 presses not so often on its rendezvous partner. So that it comes to a more even wear of the synchronous flat belt drive.

Description of a Specific First Embodiment

With reference to the FIG. 1*a* until 1*i* an embodiment of the invention is illustrated. With this embodiment of the invention two engaging bodies 500 are rotatably connected to each other by a flat belt 100, whereas both engaging bodies 500 each have one sprocket as rotation member 200, and whereas the endless flat belt 100 consists of an endless strip 110.

The here described embodiment of the synchronous flat belt drive according to the invention is planned for an operation with a dry environment with an operation temperature of about 150° C., a power transmission of 2.09 kW, a torque to be transmitted in the amount of 2.0 Nm and a rotational speed of the engaging bodies 500 in the amount of 10,000 rpm.

With reference to the FIG. 1*a* the flat belt 100 can circulate clockwise or counterclockwise. Both engaging bodies 500 are identically formed and can be used with a driving operating mode or with a driven operating mode.

With reference to the FIGS. 1*a* and 1*b* every engaging body 500 comprises each one rotation member 200 and two pulleys 300, which are supported by a common shaft 600.

With reference to the FIG. 1*c* an engaging body 500 with a construction made in one piece can be form jointly connected to a shaft 600 by means of a parallel key 601; with reference to the FIG. 1*d* an engaging body 500 also can be formed of individual components, here of two pulleys 300 and a rotation member 200 arranged in between, whereas the individual elements directly adjacent to one another are form jointly connected to a shaft 600 by means of a long parallel key 601; with reference to the FIG. 1*e* with a separated forming of the pulleys 300 and the rotation member 200 arranged in between only the rotation member 200 can be form jointly connected to the shaft 600 by means of a short parallel key 602, whereas the pulleys 300 adjacent to the sprocket are supported by the shaft 600 on rolling bearings 603; with reference to the FIG. 1*f* with a separated forming of the pulleys 300 and the rotation member 200 arranged in between the both pulleys 300 each can be form jointly connected to the shaft 600 by means of a parallel key 604 of medium length, whereas the rotation member 200 can be controllably form jointly connected to the shaft 600 by means of a pulling wedge gear 400, and whereas in this case the shaft 600 is formed as a hollow shaft.

With reference to FIG. 1*a* and FIG. 1*c* until if the rotation member 200 was formed as a sprocket, and namely as a standardised sprocket according to DIN 8196 for engaging with a roller chain according to DIN 8187 having the following standard measures:

B=8.7 mm;
Z=12;
P=15.875 mm;
$d_1$=10.16 mm;
$\alpha=\pi/Z=\pi/12=0.2618$ rad;
d=P/sin $\alpha$=15.875 mm/sin 0.2618 rad=61.34 mm;
d*=P·cot $\alpha$=15.875 mm·cot 0.2618 rad=59.25 mm;
$\gamma$=19°.

A chromium molybdenum nickel steel alloy was selected as material for the sprocket.

With reference to the FIG. 1*c* until if the two identical in construction outer pulleys 300 were formed relative to the width $b_{op}$ and the diameter d' of the pulley working surface cylinder having the following measures:

$b_{op}=b_r+b_w+b_g$=2.0 mm+7.0 mm+2.0 mm=11.0 mm;

d'=d=61.34 mm;

whereas the axial width $b_r$ of the recess 301 and the width $b_g$ of the guiding member 303 each were selected as 2.0 mm, and the width $b_w$ of the pulley working surface as 7.0 mm, and whereas the diameter d' of the pulley working surface cylinder was selected equal to the pitch circle diameter d of the sprocket.

A chromium molybdenum nickel steel alloy likewise was selected as base material for the pulleys 300.

After defining of the width measures of the sprocket 200 and the pulleys 300 the width $b_{eb}$ of the engaging body 500 can be defined from the relationship $b_{eb}=n·B+(n+1-2)·b_{ip}+2·b_{op}$, and one obtains for n=1

$b_{eb}=B+2·b_{op}$=8.7 mm+2·11.0 mm=30.7 mm.

With reference to the FIG. 1*g* the series arrangement of apertures 101 is arranged at the flat side of the flat belt 100 symmetrically to the longitudinal axis of the flat belt 100.

The geometry of the series arrangement of apertures 101 at the flat belt 100 is defined by the geometry of the sprocket, the selected diameters of the pulley working surface cylinder, and the selected clearance values.

Consequently one obtains with the above defined geometry of the sprocket 200 and the pulleys 300 together with the selected clearance values:

$\Delta_3$=1.00 mm;

$\Delta_4$=2.00 mm;

firstly for y* y*=d/2−d*/2=61.34 mm/2−59.25 mm/2=1.04 mm;

and then for the perpendicular distance between the two in the longitudinal direction of the flat belt 100 succeeding sides of a connecting member 102

$u(y^*)=P·(\alpha·\cot \alpha-1)+d_1+2·\alpha·y^*+2·y^*·\tan \gamma-\Delta_3$ after entering of the values u(1.04 mm)=10.06 mm;

and then for the perpendicular distance between the two in the longitudinal direction of the flat belt 100 succeeding sides of an aperture 101

$v(y^*)=P-d_1-2·y^*·\tan \gamma+\Delta_3$ after entering of the values $v(1.04 \text{ mm}) = 6.00 \text{ mm}$;

and finally for the perpendicular distance between the two perpendicularly to the longitudinal direction of the flat belt 100 succeeding sides of an aperture 101

$w = B + \Delta_4$ after entering of the values $w = 10.70 \text{ mm}$.

The width $b_o$ for the flat belt results from the relationship:

$b_0 = b_{eb} - 2b_g = 30.7 \text{ mm} - 2 \cdot 2.0 \text{ mm} = 26.70 \text{ mm}$;

consequently one obtains for the width $b_c$ of a flat belt tension cord 103

$b_v = (b_0 - w)/2$ after entering the values $b_c = 8.00 \text{ mm}$.

With reference to FIG. 1h and FIG. 1i the flat belt 100 comprises one endless strip 110, whereas the strip 110 only forms one layer and was manufactured of a thin walled welded tube by means of the above described roll blanking device. As material for the strip 110 the cold rolled steel alloy X6CrNiMoTi17-12-2 (1.4571) was selected. This material has a high temperature resistance, is well weldable and requires no heat treatment after the welding.

The selected material with cold rolled condition has a tensile strength of 1200 N/mm², however for the welding and the higher operation temperature a safety factor of four was selected, so that for the defining of the thickness of the strip 110 it was calculated with an allowable stress of 300 N/mm².

The diameter of the pulley working surface cylinder above was defined according to the relationship d'=d=61.34 mm.

Consequently with a given torque in the amount of 2.0 Nm a tension force to be transmitted by the tension cords 103 results in the amount of 65.21 N. And from this with an above defined total width of both tension cords in amount of 16.0 mm and the allowable total stress in the amount of 300 N/mm² one can calculate the thickness of the strip, and one obtains 0.0136 mm, whereas however 0.4 mm was selected.

Now it is still checked whether the calculated thickness $t_0$ of the flat belt fulfils the condition for the minimal allowable diameter of a pulley working surface. And one obtains by use of the relationship $d'_{min\ zul} = 2 \cdot t_0 / \sigma_{zul}$ with a modulus of elasticity in the amount of 185,000 N/mm² for $d'_{min\ zul}$ a value in the amount of 49.33 mm. This means, the selected diameter d'=61.34 mm also can be accepted from view of the bending stress appearing with a cycle within the strip 110.

None of the connecting members 102 of the strip 110 has a reinforcement. However for the disharmonising of the strip 110 an additional form member 121 (not pictured) can be fixed to selected connecting members 102.

The flat belt 100 only comprises one endless strip 110, which is formed as tension layer, whereas both at the strip 110 and at the pulley working surfaces 302 it is done without friction layers. However for adjusting of a wanted static friction coefficient both the surface of the strip 110 and the pulley working surfaces 302 can be provided with hard material particles, as for example carbide particles, nitride particles, boride particles or diamond particles by means of a known coating process.

With reference to the FIG. 1a the shaft 600 of the upper engaging body 500 can be moved upward along the symmetry axis of the synchronous flat belt drive for adjusting of the tension of the synchronous flat belt drive, and then be fixed in this position. Alternatively thereto also a displacement of the lower engaging body 500 in opposed direction can be planned.

According to the FIG. 1f a form joint connection between a shaft 600 and a sprocket 200 can be manufactured with the operation by means of the pulling wedge gear 400. This happens for example with some uses firstly after the accelerating and the stabilising of the rotational speed. With other uses just during the accelerating phase or the decelerating phase a form joint connection between a shaft 600 and a sprocket 200 is established. Further a form joint connection between a shaft 600 and a sprocket 200 can automatically be established by means of the pulling wedge gear 400, if a difference between the rotational speeds of the pulleys of the different engaging bodies is detected by means of sensors and a processing unit.

Further the circulating flat belt 100 is permanently contactless inspected for cracks by an eddy current probe (not pictured), whereas the probe transmits the measuring signal to an analysing and indicating unit (not pictured).

Description of Additional Specific Second and Third Embodiments

With reference to the FIGS. 2a until 2k a further embodiment of the invention is illustrated. With this embodiment of the invention two engaging bodies 500 are rotatably connected to each other by a flat belt 100, whereas both engaging bodies 500 each have one sprocket as rotation member 200, and whereas the endless flat belt 100 consists of an opened spirally wound up strip 110, and whereas the flat belt 100 is provided with additional form members 121 at its connecting members 102, and whereas the ends of the strip 110 each are provided with a taper 111 at both longitudinal sides by a predetermined angle from a predetermined distance to the end.

A further embodiment of the invention is illustrated in the FIGS. 3a until 3h and 3j until 3k. With this embodiment of the invention two engaging bodies 500 are rotatably connected to each other by a flat belt 100, whereas both engaging bodies 500 each have one face gear as rotation member 200, and whereas according to FIG. 3j the endless flat belt 100 consists of two endless strips 110 with a layer configuration having two layers, and whereas according to FIG. 3k the endless flat belt 100 consists of a layer configuration having two layers, whereas the inner layer is formed by two opened strips 110, which each abut on each other in the 12 o'clock position and in the 6 o'clock position, and whereas the outer layer is formed by one endless strip 110.

A further embodiment of the invention is illustrated in the FIG. 3i. With this embodiment of the invention three engaging bodies 500 are rotatably connected to each other by a flat belt 100, whereas the three engaging bodies 500 each have one face gear 200 as rotation member 200, and whereas additionally a single face gear 200 is in engagement with an engaging body 500.

Conclusion, Description of Alternative Embodiments and Scope of the Invention

Achievable Advantages by the Invention

On the basis of the above conducted description of different embodiments it was recognisable, that with a simple construction frictionless gear boxes can be manufactured for the different load ranges.

In detail thereby the following advantages are achieved:

a) by a controllable form joint between a rotation member 200, which is laterally beside a pulley 300, is coaxially arranged to a pulley 300, and with whose projections 210 the flat belt apertures 101 engage, and a pulley 300 a synchronisation of the rotational movement between pulleys 300 of engaging bodies 500 can controllably be established within the synchronous flat belt drive;

b) when engaging a flat belt aperture 101 with a projection 210 of a rotation member 200 no friction losses occur, because the engagement happens purely rolling and a flat belt aperture 101 supports only tangentially to a pulley working surface cylinder on a projection 210 of a rotation member 200, whereby a efficiency factor of the synchronous flat belt drive according to the invention of near 1.00 is achieved;

c) no projection 210 is on a pulley working surface 302, so that the circulation of a flat belt tension cord happens undisturbed;

d) conventional or standardised face gears or sprockets can be used as rotation members 200;

e) by the forming of the flat belt apertures 101 correspondingly to the standardised face gears or sprockets and correspondingly of suitable diameters of the pulley working surface cylinders the standardisation system of the machine elements of the drive technology is extended by a series of standardised flat belts 100 and by a series of standardised pulleys 300 of a synchronous flat belt drive;

f) the different types of engaging bodies 500 can be in engagement with a flat belt 100 at both flat sides of an opened or closed flat belt 100 with different combination and number, driving or driven, clockwise rotating or counterclockwise rotating, as portion or as no portion of a tensioning device, as tensioning pulley with or without tooth system 210 with the at least one rotation member 200, with small or large diameters;

g) the engaging bodies 500 can be cheaply manufactured by the use of standardised parts;

h) a cylindrical engaging body 500 having a face gear as rotation member 200 can be in an engagement with at least one face gear additionally to an engagement with a flat belt 100;

i) a flat belt is laterally guided by a guiding member 303, which is arranged adjacent to a longitudinal side of a flat belt at a pulley circumferential surface along the pulley circumference, whereas thereby the friction losses are avoided appearing with a lateral guiding of the flat belt 100 by a projection 210 and the wear is reduced;

j) a flat belt 100 with an endless or opened configuration can consist of individual strips 110 easily to be manufactured, whereas the strips 110 as material sold by the meter with a continuous process can be manufactured and inspected, and whereas thereby the flat belt 100 can be cheaply manufactured;

k) a flat belt 100 with an endless or opened configuration of several individual cold rolled metal strips 110 with a layer configuration has a higher tensile strength than a flat belt 100 of a single metal strip having a thickness equal to the sum of the thicknesses of the individual strips;

l) a flat belt 100 with an endless or opened configuration of several individual strips 110 with a layer configuration has a clearly lower bending stiffness than a flat belt 100 of a single strip 110 having a thickness equal to the sum of the thicknesses of the individual strips 110;

m) individual connecting members 102 between flat belt apertures 101 can have a reinforcement by an additional mass, whereas thereby an elongated free oscillating flat belt section is disharmonised when running through of the reinforcement and consequently gets not in resonance;

n) with a corresponding material selection the synchronous flat belt drive also can be used with an oil environment;

o) with a corresponding material selection the synchronous flat belt drive also can be used with a higher ambient temperature than a tooth belt drive;

p) low even wear of the engaging bodies 500 by the selection of an uneven (even) number of flat belt apertures 101 of an endless flat belt 100 with an even (uneven) number of teeth with the engaging bodies 500;

q) with an operation with the use of metal strips 110 as tension layer damages can early be detected, as for example the conductivity is measured, or the circulating flat belt 100 is contactless inspected for cracks by an eddy current probe;

r) with a suitable forming of the gear box rolling bearings (lubricant reservoir, plastic material-steel-rolling combination, etc.) a gear box having synchronous flat belt drives according to the invention can be formed without lubricating oil.

Description of Alternative Embodiments and Scope of the Invention

Although my above conducted description encloses a lot of specifications, these should not be interpreted as limitations for the scope of the invention, but rather than demonstration of some embodiments therefrom. Many alternative embodiments are possible.

The subsequent described alternative embodiments are not pictured in the drawings, however a person skilled in the art can understand the alternative embodiments presented here by means of the above conducted general description of the embodiments.

Synchronous Flat Belt Drive

With the existing gear box constructions having standardised face gears the movement transmission between parallel axes can be performed by means of a flat belt according to the invention, as correspondingly axially aligned gears on adjacent parallel axes each are added at both sides by equally formed pulleys according to the invention, which are supported on these axes for example by rolling bearings and have guiding members for the flat belt, whereas then the flat belt supports on these pairs of pulleys radially to the axes, and whereas the flat belt supports on the gears only tangentially to a pulley working surface cylinder.

With a synchronous flat belt drive engaging bodies according to the invention and normally formed pulleys can be connected over the flat belt according to the invention. Also only normal pulleys can be connected over the flat belt according to the invention.

Engaging Bodies

An engaging body is formed by n pulleys (n=1, 2, 3, . . . ) and n+1 coaxial rotation members, whereas a pulley is positioned between a pair of coaxial rotation members.

An engaging body is formed by n pulleys (n=1, 2, 3, . . . ) and n coaxial rotation members, whereas correspondingly to the respective axial direction of an engaging body each a pulley follows a rotation member, or a rotation member a pulley.

Connection Between Shaft and Engaging Body

The connection between a shaft and a rotation member respectively between a shaft and a pulley can be formed as a magnetic powder coupling, a fluid flow coupling, a centrifugal force coupling, a free wheel coupling, or a slipping coupling.

A shaft can support several engaging bodies each having identical or different connecting types between shaft and rotation member or between rotation member and pulley, whereas the engaging bodies are arranged on the shaft side by side. Further also gears or normal pulleys can be arranged on a shaft besides engaging bodies.

An engaging body can be elastically supported by a shaft. Further a shaft of an engaging body can be elastically supported by a casing. And finally the transmission of the driving forces from a shaft over an engaging body to a flat belt can be effected over elastic force transmission members.

Rotation Member

At least one of the rotation members of an engaging body can be divided, whereas at least one partial section of a rotation member can be removed.

The rotation members of an engaging body can have a different width and they can be manufactured of a different material.

The foot area of the tooth system of a rotation member can be filled with a material in radial direction until to the diameter of the pulley working surface cylinder. The tip area of the tooth system of a rotation member can be removed in radial direction until close to the diameter of the pulley working surface cylinder.

With a forming of a rotation member as a face gear this gear can have beside an involute tooth system also a cycloidal tooth system, a conchoidal tooth system, or a lantern gear tooth system. Further rotation members can be formed as face gears having a helical gear tooth system, a double helical gear tooth system, or an arc shaped tooth system. Further the rotation members can have n teeth (n=1, 2, 3, . . . ).

And further the tooth system surface of a rotation member can be formed elastic at the supporting faces for a flat belt connecting member.

Pulley

A pulley also can be formed not cylindrical.

The outer pulleys of an engaging body also can be formed without the lateral guiding members.

A pulley also can be formed without an annular recess adjacent to a rotation member.

The diameter of the pulley working surface cylinder also can be less than the pitch circle diameter of an adjacent rotation member formed as a gear.

At least one of the pulleys of an engaging body can be divided, whereas at least one partial section of a pulley can be removed.

The pulleys of an engaging body can have a different width and they can be manufactured of a different material.

Flat Belt

With a flat belt the individual strips also can have a different thickness.

With a flat belt the individual strips also can be manufactured of a different material.

At least one end of an opened strip also can be not tapered or can be tapered otherwise, for example as only one side is tapered, or also only the corners can be rounded.

With a flat belt a strip in at least one layer also can be at least once divided, whereas at least one partial section of a strip also can be removed.

The generatrix of the series arrangement of apertures at a flat belt also can be the rolling of an engaging body having the above mentioned characteristics at a flat side of a planely arranged flat belt parallel to its longitudinal direction.

At least one corner of at least one aperture can be formed as a circle segment, whereas the centre of the circle, which forms the circle segment, also can be positioned outside the side lines, which form the corners.

At least one side line of at least one aperture can have the shape of a periodic saw tooth curve, sinus curve, or rectangle curve.

The width of a tension cord can be equal to, less than, or greater than the width of an aperture.

A flat belt also can be formed in an opened construction.

A friction layer can be formed at both sides of a flat belt. Also it can be formed only at one side of a flat belt, and also it can be formed only with at least one tension cord.

Also riveted connections can be provided for the connection of parts of a strip and/or of strips, whereas the riveted connections also can be formed at the tension cords, and whereas an opening for the reception of a riveted bolt also can be an elongated hole, which extends with its length parallel to the longitudinal axis of the flat belt.

The connection of parts of a strip and/or of strips also can be effected by means of narrow strips, filaments, wires, or rings, which are fed through apertures at the flat belt.

CONCLUSION

Consequently the scope of the invention should be defined by the appended claims and their legal equivalence and not by the given examples.

The invention claimed is:

1. A synchronous flat belt drive, comprising
   (a) an endless flat belt having at least one series arrangement of regularly spaced openings and having a layer configuration of at least one opened and overlapping strip wherein the ends of said at least one overlapping strip are connected by at least one arc shaped flat spring,
   (b) a plurality of engaging bodies for driving said flat belt or being driven by said flat belt and for supporting said flat belt, each having a plurality of supporting surfaces, at least one driving or being driven rotation member for engaging with the openings of said flat belt arranged between said supporting surfaces, two lateral means for guiding said flat belt and one shaft,
   (c) said engaging bodies each being lockable supported by said shaft for driving and supporting said engaging bodies,
   (d) said at least one driving or being driven rotation member being formed as a standardised face gear.

2. The synchronous flat belt drive of claim 1 wherein at east one of said engaging bodies has none of said rotation members.

* * * * *